US011923756B2

(12) United States Patent
Kobayashi et al.

(10) Patent No.: US 11,923,756 B2
(45) Date of Patent: Mar. 5, 2024

(54) CONTROL APPARATUS FOR POWER CONVERSION APPARATUS

(71) Applicant: DENSO CORPORATION, Kariya (JP)

(72) Inventors: Naoto Kobayashi, Nisshin (JP); Seiji Iyasu, Nisshin (JP); Yuuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 322 days.

(21) Appl. No.: 17/507,938

(22) Filed: Oct. 22, 2021

(65) Prior Publication Data

US 2022/0045595 A1 Feb. 10, 2022

Related U.S. Application Data

(63) Continuation of application No. PCT/JP2020/017548, filed on Apr. 23, 2020.

(30) Foreign Application Priority Data

Apr. 25, 2019 (JP) ................................ 2019-084739

(51) Int. Cl.
*H02M 1/00* (2006.01)
*H02M 1/08* (2006.01)
(Continued)

(52) U.S. Cl.
CPC ......... *H02M 1/0003* (2021.05); *H02M 1/083* (2013.01); *H02M 1/4233* (2013.01); *H02M 7/1626* (2013.01)

(58) Field of Classification Search
CPC .. H02M 1/0003; H02M 1/083; H02M 1/4233; H02M 7/1626
See application file for complete search history.

(56) References Cited

U.S. PATENT DOCUMENTS 10,491,136 B2 * 11/2019 Iyasu .................... H02M 7/219
10,615,680 B2 * 4/2020 Iyasu ..................... H02M 1/08
(Continued)

FOREIGN PATENT DOCUMENTS

JP H09-275685 A 10/1997
JP 2002-260833 A 9/2002
(Continued)

OTHER PUBLICATIONS

Jun. 16, 2020 International Search Report issued in International Patent Application No. PCT/JP2020/017548.

*Primary Examiner* — Kyle J Moody
(74) *Attorney, Agent, or Firm* — Oliff PLC

(57) ABSTRACT

A control apparatus for a power conversion apparatus acquires a detected voltage of an alternating-current power supply. The control apparatus determines a period from when the detected voltage exceeds a first determination value for determining a zero-up-crossing timing of an actual voltage of the alternating-current power supply until the detected voltage falls below a second determination value for determining a zero-down-crossing timing of the actual voltage to be a period during which the actual voltage has a positive polarity, and determines a period from when the detected voltage falls below the second determination value until the detected voltage exceeds the first determination value to be a period during which the actual voltage has a negative polarity. The first determination value is less than the detected voltage when the actual voltage is zero, and the second determination value is greater than the detected voltage when the actual voltage is zero.

13 Claims, 20 Drawing Sheets

(51) Int. Cl.
   *H02M 1/42*     (2007.01)
   *H02M 7/162*    (2006.01)

(56) References Cited

U.S. PATENT DOCUMENTS

| | | | |
|---|---|---|---|
| 10,637,370 B2 * | 4/2020 | Iyasu | ................... H02M 1/12 |
| 10,910,958 B2 * | 2/2021 | Kobayashi | ........ H02M 1/4225 |
| 11,183,944 B2 * | 11/2021 | Iyasu | ..................... H03K 5/13 |
| 2005/0199614 A1 | 9/2005 | Uchida et al. | |
| 2006/0237449 A1 | 10/2006 | Uchida et al. | |
| 2006/0237450 A1 | 10/2006 | Uchida et al. | |
| 2007/0125771 A1 | 6/2007 | Uchida et al. | |

FOREIGN PATENT DOCUMENTS

| | | |
|---|---|---|
| JP | 2015-198460 A | 11/2015 |
| JP | 2018-007326 A | 1/2018 |

* cited by examiner (a)

(b)

CONTROL APPARATUS FOR POWER CONVERSION APPARATUS

CROSS-REFERENCE TO RELATED APPLICATION

The present application is a continuation application of International Application No. PCT/JP2020/017548, filed on Apr. 23, 2020, which claims priority to Japanese Patent Application No. 2019-084739, filed on Apr. 25, 2019. The contents of these applications are incorporated herein by reference in their entirety.

BACKGROUND

Technical Field

The present disclosure relates to a control apparatus for a power conversion apparatus.

Related Art

A control apparatus that operates a drive switch by known peak-current-mode control to control a reactor current that flows to a reactor of an alternating-current/direct-current (AC/DC) conversion apparatus to a current command value is known. The control apparatus reduces distortion in an output current by acquiring a voltage of an alternating-current power supply as a detected voltage and adding a current correction value that changes based on a phase of the acquired detected voltage to the current command value.

SUMMARY

One aspect of the present disclosure provides a control apparatus for a power conversion apparatus. The control apparatus acquires a detected voltage of an alternating-current power supply. The control apparatus determines a period from when the detected voltage exceeds a first determination value for determining a zero-up-crossing timing of an actual voltage of the alternating-current power supply until the detected voltage falls below a second determination value for determining a zero-down-crossing timing of the actual voltage to be a period during which the actual voltage has a positive polarity, and determines a period from when the detected voltage falls below the second determination value until the detected voltage exceeds the first determination value to be a period during which the actual voltage has a negative polarity. The first determination value is less than the detected voltage when the actual voltage is zero, and the second determination value is greater than the detected voltage when the actual voltage is zero.

DESCRIPTION OF THE EMBODIMENTS

Figure 1:
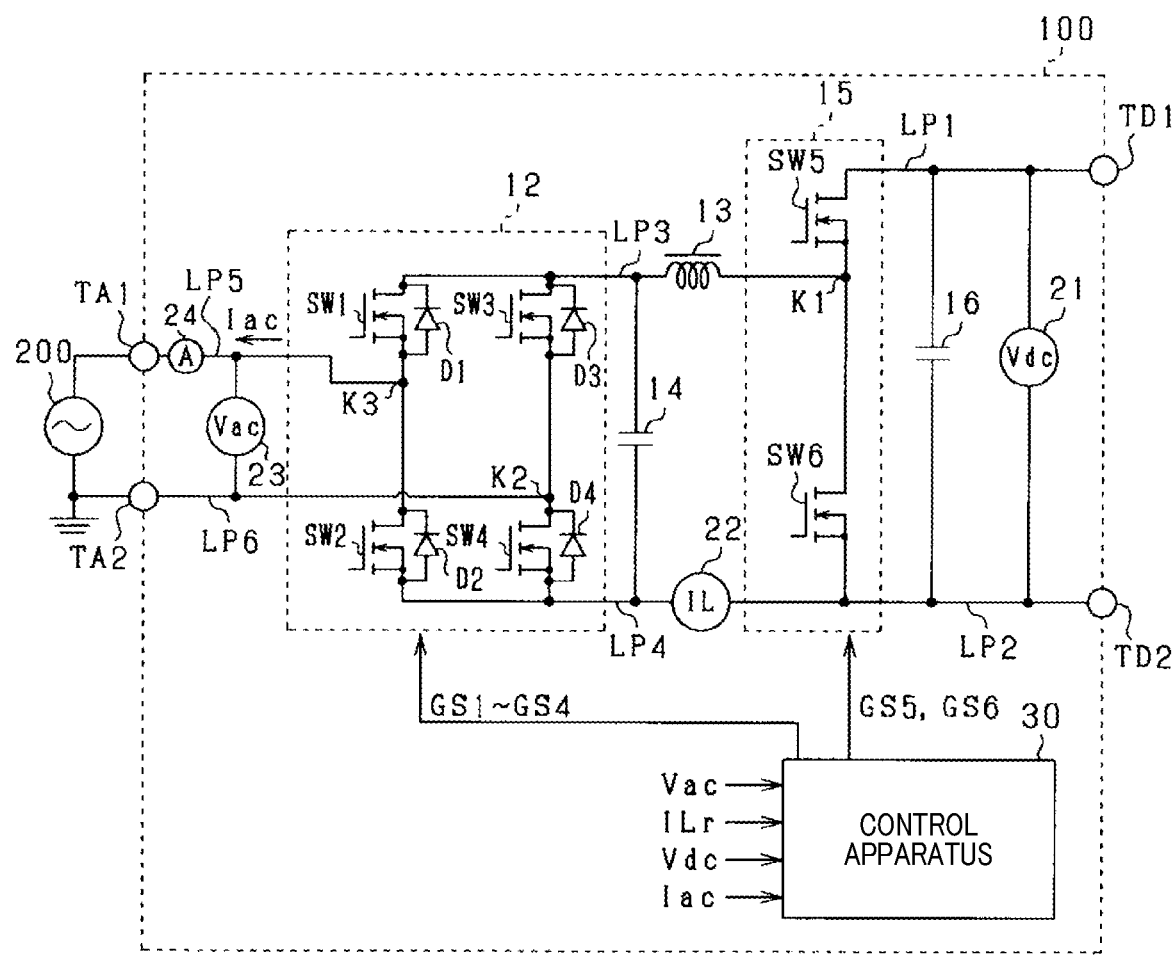
FIG. 1 is a configuration diagram of a power conversion apparatus.

JP-A-2015-198460 discloses a control apparatus that operates a drive switch by known peak-current-mode control to control a reactor current that flows to a reactor of an alternating-current/direct-current (AC/DC) conversion apparatus to a current command value. The control apparatus reduces distortion in an output current by acquiring a voltage of an alternating-current power supply as a detected voltage and adding a current correction value that changes based on a phase of the acquired detected voltage to the current command value.

In a power conversion apparatus, a timing at which a polarity of an actual voltage that is an actual voltage of an alternating-current power supply changes is determined based on a detected voltage that is detected by a voltage sensor. A set of switches that are set to an ON state among switches that configure a full-bridge circuit is alternately switched synchronously with the timing.

Here, as a result of the detected voltage being phase-shifted or offset above or below in relation to the actual voltage, a timing at which switching is performed between the set of switches that are set to an ON state and a set of switches that are set to an OFF state may shift from the timing at which the polarity of the actual voltage is switched. As a result, in the full-bridge circuit, a short circuit that includes the set of switches that are turned on and diodes that are connected in antiparallel to the set of switches that are turned off is formed. An overcurrent flowing to the short circuit becomes a concern.

It is thus desired to provide a control apparatus for a power conversion apparatus that includes a full-bridge circuit in which the control apparatus for a power conversion apparatus is capable of suppressing a flow of overcurrent.

An exemplary embodiment of the present disclosure provides a control apparatus for a power conversion apparatus that includes a reactor, a first alternating-current-side terminal, a second alternating-current-side terminal, a first direct-current-side terminal, a second direct-current-side terminal, and a full-bridge circuit that is provided between the alternating-current-side terminals and the reactor.

The power conversion apparatus is provided with at least either of a function for converting an alternating-current voltage of an alternating-current power supply that is inputted from the alternating-current-side terminals to a direct-current voltage and outputting the direct-current voltage from the direct-current-side terminals, and a function for converting a direct-current voltage that is inputted from the direct-current-side terminals to an alternating-current voltage and outputting the alternating-current voltage from the alternating-current-side terminals.

The full-bridge circuit has a series-connection body of a first switch and a second switch, and a series-connection body of a third switch and a fourth switch, and is configured by the series-connection bodies being connected in parallel. Diodes are respectively connected in antiparallel to the first switch, the second switch, the third switch, and the fourth switch. A connection point between the first switch and the second switch is connected to the first alternating-current-side terminal. A connection point between the third switch and the fourth switch is connected to the second alternating-current-side terminal.

The control apparatus includes a detected voltage acquiring unit, a polarity determining unit, and an operating unit.

The detected voltage acquiring unit acquires a detected voltage that is a voltage value of the alternating-current power supply that is detected by a voltage sensor.

The polarity determining unit determines a period from when the detected voltage exceeds a first determination value for determining a zero-up-crossing timing of an actual voltage that is an actual voltage value of the alternating-current power supply until the detected voltage falls below a second determination value for determining a zero-down-crossing timing of the actual voltage to be a period during which the actual voltage has a positive polarity. The polarity determining unit also determines a period from when the detected voltage falls below the second determination value until the detected voltage exceeds the first determination value to be a period during which the actual voltage has a negative polarity. The first determination value is a voltage value that is less than the detected voltage when the actual voltage is zero. The second determination value is a voltage value that is greater than the detected voltage when the actual voltage is zero.

The operating unit alternately switches a set that is set to an ON state, of a set of the first switch and the fourth switch and a set of the second switch and the third switch, each time the polarity of the actual voltage that is determined by the polarity determining voltage is switched.

When the detected voltage is phase-shifted or offset above or below in relation to the actual voltage, the detected voltage of the voltage sensor at a zero-cross timing of the actual voltage deviates from the actual voltage. In the above-described configuration, the polarity of the actual voltage is determined by the first determination value that determines the zero-up-crossing timing of the actual voltage and the second determination value that determines the zero-down-crossing timing of the actual voltage, and the detected voltage being compared.

Specifically, the period from when the detected voltage exceeds the first determination value until the detected voltage falls below the second determination value is determined to be the period during which the actual voltage has a positive polarity. The period from when the detected voltage falls below the second determination value until the detected voltage exceeds the first determination value is determined to be the period during which the actual voltage has a negative polarity.

As a result, even when the detected voltage is phase-shifted or offset above or below the actual voltage, an operation timing of a set that is set to an ON state, of the set of the first and fourth switches and the set of the second and third switches, shifting from the timing at which the polarity of the actual voltage is switched is suppressed. Consequently, an overcurrent can be prevented from flowing to the power conversion apparatus.

First Embodiment

A power conversion apparatus according to a present embodiment will be described. According to the present embodiment, the power conversion apparatus converts direct-current power that is supplied from a direct-current power supply through a direct-current-side terminal to alternating-current power and supplies to the alternating-current power to an alternating-current power supply.

The direct-current power supply (not shown) is connected to first and second direct-current-side terminals TD1 and TD2 of a power conversion apparatus 100 shown in FIG. 1. An alternating-current power supply 200 is connected to first and second alternating-current-side terminals TA1 and TA2. For example, the alternating-current power supply 200 may be a commercial power supply. For example, the direct-current power supply may be a battery or a DC/DC conversion circuit.

The power conversion apparatus 100 includes a capacitor 16, a half-bridge circuit 15, an intermediate capacitor 14, a reactor 13, a full-bridge circuit 12, and first to sixth wirings LP1 to LP6.

A first end of the first wiring LP1 is connected to the first direct-current-side terminal TD1. A first end of the second wiring LP2 is connected to the second direct-current-side terminal TD2. The first wiring LP1 and the second wiring LP2 are connected by the capacitor 16.

The half-bridge circuit 15 is connected to second ends of the first and second wirings LP1 and LP2. The half-bridge circuit 15 includes a fifth switch SW5 and a sixth switch SW6. The fifth and sixth switches SW5 and SW6 are voltage-driven-type switches.

According to the present embodiment, the fifth and sixth switches SW5 and SW6 are N-channel metal-oxide-semiconductor field-effect transistors (MOSFETs). A source of the fifth switch SW5 and a drain of the sixth switch SW6 are connected. A drain of the fifth switch SW5 is connected to the first wiring LP1 and a source of the sixth switch SW6 is connected to the second wiring LP2.

The half-bridge circuit 15 and the full-bridge circuit 12 are connected by the third wiring LP3 and the fourth wiring LP4. A first end of the third wiring LP3 is connected to a first connection point K1 between the source of the fifth switch SW5 and the drain of the sixth switch SW6. The reactor 13 is provided in the third wiring LP3. In addition, a first end of the fourth wiring LP4 is connected to the source of the sixth switch SW6. Second ends of each of the third and fourth wirings LP3 and LP4 are connected to the full-bridge circuit 12. The third wiring LP3 and the fourth wiring LP4 are connected by the intermediate capacitor 14.

The full-bridge circuit 12 includes first to fourth switches SW1 to SW4. The first to fourth switches SW1 to SW4 are voltage-driven-type switches. According to the present embodiment, the first to fourth switches SW1 to SW4 are N-channel MOSFETs. A source of the first switch SW1 and a drain of the second switch SW2 are connected. A source of the third switch SW3 and a drain of the fourth switch SW4 are connected. Respective drains of the first and third switches SW1 and SW3 are connected to the third wiring LP3. Respective sources of the second and fourth switches SW2 and SW4 are connected to the fourth wiring LP4. The first to fourth switches SW1 to SW4 respectively include first to fourth body diodes D1 to D4 that are connected in antiparallel.

A second connection point K2 between the source of the third switch SW3 and the drain of the fourth switch SW4 is connected to a first end of the sixth wiring LP6. A second end of the sixth wiring LP6 is connected to the second alternating-current-side terminal TA2. A third connection point K3 between the first switch SW1 and the second switch SW2 is connected to a first end of the fifth wiring LP5. A second end of the fifth wiring LP5 is connected to the first alternating-current-side terminal TA1.

The power conversion apparatus 100 includes a direct-current voltage sensor 21, a reactor current sensor 22, and an alternating-current voltage sensor 23. The direct-current voltage sensor 21 is connected between the first and second wirings LP1 and LP2, and detects a voltage that is inputted through the first and second direct-current-side terminals TD1 and TD2 as a direct-current voltage Vdc. The reactor current sensor 22 is provided in the fourth wiring LP4 and detects a current that flows to the reactor 13 as a reactor current ILr. The alternating-current voltage sensor 23 is connected between the fifth and sixth wirings LP5 and LP6, and detects a voltage of the alternating-current power supply 200 as a detected voltage Vac.

Figure 2:
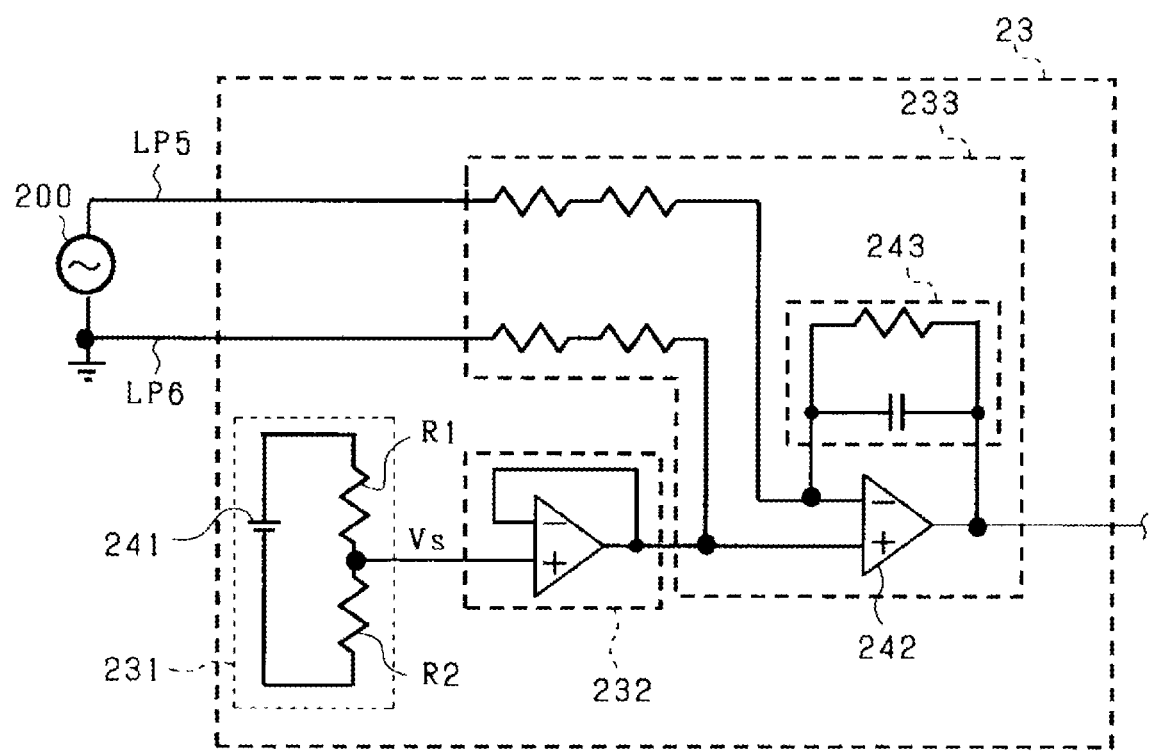
FIG. 2 is a circuit diagram of an alternating-current voltage sensor.

As shown in FIG. 2, the alternating-current voltage sensor 23 includes a reference voltage generating unit 231, a voltage follower unit 232, and a difference amplifying unit 233. The reference voltage generating unit 231 includes a series-connection body of resistors R1 and R2, and a low-voltage source 241. The reference voltage generating unit 231 outputs a reference voltage Vs by dividing a voltage that is supplied from the low-voltage source 241 by the resistors R1 and R2. The reference voltage Vs is a voltage that serves as a reference for the detected voltage Vac of the alternating-current voltage sensor 23. Specifically, the reference voltage Vs is the detected voltage Vac when an actual voltage Vr that is an actual voltage value of the alternating-current power supply 200 is zero.

The alternating-current power supply 200 is connected by the fifth wiring LP5 to an inverted input terminal of an operational amplifier 242 that is provided in the difference amplifying unit 233, and the alternating-current power supply 200 is connected by the sixth wiring LP6 to a non-inverted input terminal. The inverted input terminal and an output terminal of the operational amplifier 242 are connected by a lowpass filter 243. The reference voltage Vs from the reference voltage generating unit 231 is inputted to the non-inverted input terminal of the operational amplifier 242 through the voltage follower unit 242. The operational amplifier 242 outputs the detected voltage Vac that is based on the actual voltage Vr of the alternating-current power supply 200, with the reference voltage Vs as a center.

According to the present embodiment, a polarity of the detected voltage Vac is prescribed in a following manner. In a state in which a voltage at the first alternating-current-side terminal TA1 is greater than a voltage at the second alternating-current-side terminal TA2, the detected voltage Vac is determined to have a positive polarity. In a state in which the voltage at the second alternating-current-side terminal TA2 is greater than the voltage at the first alternating-current-side terminal TA1, the detected voltage Vac is determined to have a negative polarity.

The power conversion apparatus 100 includes an output current sensor 24 that detects a current that flows to the first and second alternating-current-side terminals TA1 and TA2 as an output current Iac. According to the present embodiment, the output current sensor 24 is provided in the fifth wiring LP5. The output current Iac that flows from the first alternating-current-side terminal TA1 towards the second alternating-current-side terminal TA2 through the alternating-current power supply 200 has a positive polarity. The output current Iac that flows from the second alternating-current-side terminal TA2 towards the first alternating-current-side terminal TA1 through the alternating-current power supply 200 has a negative polarity. Detection values of the sensors 21 to 24 are inputted to a control apparatus 30.

The control apparatus 30 performs on/off operation of the first to sixth switches SW1 to SW6. Here, for example, functions provided by the control apparatus 30 can be provided through software that is recorded in a physical memory apparatus and a computer that runs the software, hardware, or a combination thereof.

The control apparatus 30 performs on/off operation of the fifth and sixth switches SW5 and SW6 by peak-current-mode control to control the acquired reactor current ILr to a command current ILa* that is calculated based on the detected voltage Vac. Of a set of the first and fourth switches SW1 and SW4 and a set of the second and third switches SW2 and SW3, the control apparatus 30 sets to an ON state the set of the first and fourth switches SW1 and SW4 during a period in which the actual voltage Vr has a positive polarity, and sets to an ON state the set of the second and third switches SW2 and SW3 during a period in which the actual voltage Vr has a negative polarity.

Next, functions of the control apparatus 30 will be described with reference to FIG. 3. The control apparatus 30 includes a phase estimating unit 31, a waveform generating unit 32, a multiplier 33, an absolute value calculating unit 34, an adder 35, a current correcting unit 40, and a current control unit 50. According to the present embodiment, the control apparatus 30 corresponds to a detected voltage acquiring unit.

The phase estimating unit 31 estimates a phase $\theta$ of the detected voltage Vac based on the detected voltage Vac. As an example of an estimation method thereof, the phase estimating unit 31 counts a single cycle (360°) of the detected voltage Vac and estimates the phase $\theta$ based on the counted value. According to the present embodiment, a timing at which the detection value Vac exceeds the reference voltage Vs is $\theta=0°$, and a timing at which the detected voltage Vac falls below the reference voltage Vs is $\theta=180°$.

The waveform generating unit 32 generates a reference waveform $\sin \theta$ of the detected voltage Vac based on the phase $\theta$ of the detected voltage Vac that is estimated by the phase estimating unit 31. The reference waveform $\sin \theta$ is a value that indicates a change in voltage at a half-cycle (T/2) of the detected voltage Vac. The reference waveform sin θ has an amplitude of 1 and varies at the same cycle as the detected voltage Vac. According to the present embodiment, the reference waveform sin θ has the same phase as the detected voltage Vac.

The multiplier 33 multiplies an amplitude command value Ia* of the reactor current ILr and the reference waveform sin θ. The amplitude command value Ia* is a command value that prescribes an amplitude of the reactor current ILr. The absolute value calculating unit 34 sets an absolute value of an output value from the multiplier 33 as a pre-correction command current IL*.

The current correcting unit 40 sets a current correction value Ic that is used in correction of the pre-correction command current IL* to suppress distortion in the output current Iac. A configuration of the current correcting unit 40 according to the present embodiment will be described with reference to FIG. 4. When the direct-current voltage is converted to the alternating-current voltage, a deviation width Δi that indicates a difference between the pre-correction command current IL* and an average value Iave of the reactor current ILr in which distortion has occurred is a smallest value near a zero-cross timing of the actual voltage Vr.

Here, the deviation width Δi is a factor in distortion in the output current Iac. The deviation width Δi can be calculated using expression (1) below in which the average value Iave of the reactor current ILr is subtracted from the pre-correction command current IL*. Here, a method for deriving expression (1) below will be described hereafter.

$$\Delta i = ms \cdot \frac{\sqrt{2}\, Vrms \cdot |\sin\theta|}{Vdc} \cdot Tsw + \frac{\sqrt{2}\, Vrms \cdot |\sin\theta|(Vdc - \sqrt{2}\, Vrms \cdot |\sin\theta|)}{2LVdc} \cdot Tsw \quad (1)$$

As a result of expression (1) above, when the direct-current voltage is converted to the alternating-current voltage, the deviation width Δi takes a minimum value at the zero-cross timing of the actual voltage Vr and takes a maximum value at a peak timing of the actual voltage Vr. Therefore, as a result of the current correction value Ic being calculated based on the deviation width Δi that is calculated by expression (1) above, distortion in the output current Iac can be suppressed.

Figure 4:
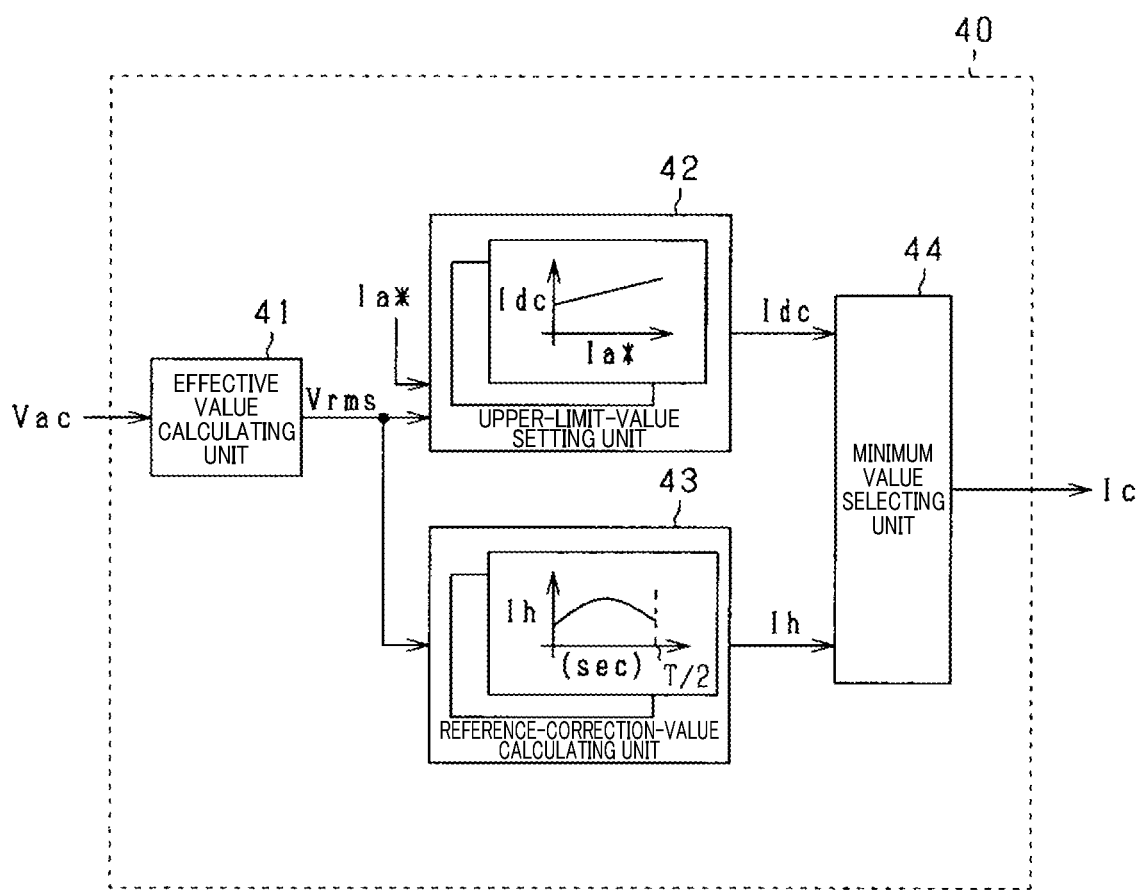
FIG. 4 is a configuration diagram of a current correcting unit.

As shown in FIG. 4, the current correcting unit 40 includes an effective value calculating unit 41, an upper-limit-value setting unit 42, a reference-correction-value calculating unit 43, and a minimum value selecting unit 44. The effective value calculating unit 41 calculates an effective value Vrms of the actual voltage Vr.

The upper-limit-value setting unit 42 sets an upper limit value Idc based on the effective value Vrms and the amplitude command value Ia*. An amount of increase in the reactor current ILr increases as the amplitude command value Ia* increases. Therefore, the upper-limit-value setting unit 42 sets the upper limit value Idc to a larger value as the amplitude command value Ia* increases. In addition, a duty ratio of an on period of the fifth switch SW5 increases as the effective value Vrms increases, and the deviation width increases. Therefore, the upper limit value Idc is set to a large value.

According to the present embodiment, the upper-limit-value setting unit 42 includes a direct-current component map that indicates a relationship between the amplitude command value Ia* and the upper limit value Idc for each effective value Vrms. For example, each effective value Vrms may correspond to the effective value Vrms of the commercial power supply in each country. Therefore, the upper-limit-value setting unit 42 can set the upper limit value Idc that is based on the amplitude command value Ia* by referencing the direct-current component map for each effective value Vrms.

The reference-correction-value calculating unit 43 sets a reference correction value Ih based on the effective value Vrms. According to the present embodiment, the reference correction value Ih that is set by the reference-correction-value calculating unit 43 takes a local minimum value at or near the zero-cross timing of the actual voltage Vr, and take a local maximum value at the peak timing. Specifically, the reference correction value Ih changes in value over time. In addition, according to the present embodiment, the reference correction value Ih is prescribed as zero at the zero-cross timing of the actual voltage Vr. However, this is not limited thereto. The reference correction value Ih may be prescribed as a value that is greater than zero at the zero-cross timing of the actual voltage Vr.

The reference-correction-value calculating unit 43 includes a correction value map that records therein the reference correction value Ih for each effective value Vrms. The correction value map prescribes the value of the reference correction value Ih such that the value increases as the effective value Vrms increases.

The minimum value selecting unit 44 sets a smaller value of the upper limit value Idc set by the upper-limit-value setting unit 42 and the reference correction value Ih set by the reference-correction-value calculating unit 43 as the current correction value Ic. Therefore, when the reference correction value Ih is a value that is less than the upper limit value Idc, the reference correction value Ih is set as the current correction value Ic. When the reference correction value Ih is a value that is equal to or greater than the upper limit value Idc, the upper limit value Idc is set as the current correction value Ic.

Figure 3:
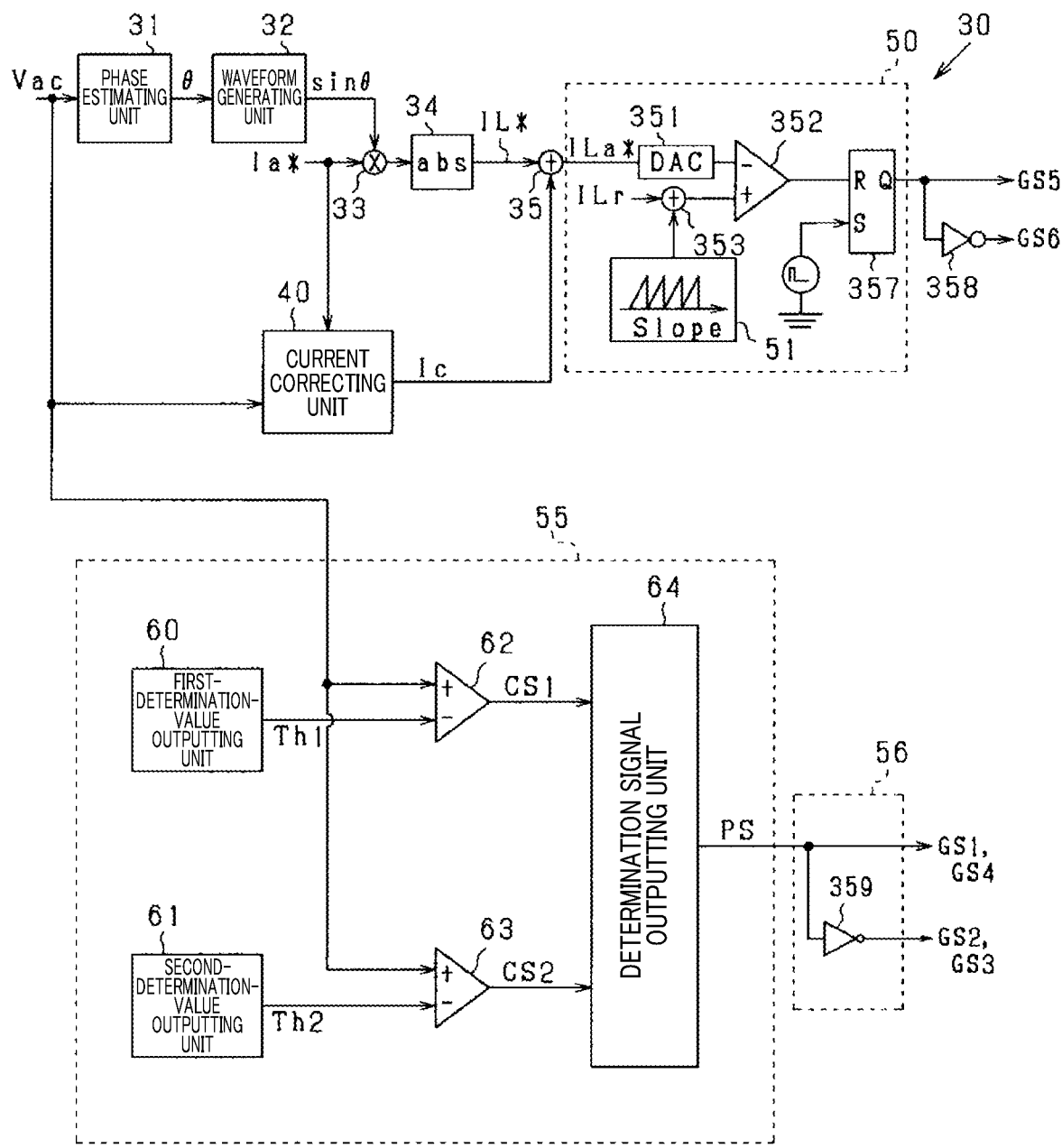
FIG. 3 is a functional block diagram of a control apparatus.

Returning to the description regarding FIG. 3, the adder 35 adds the current correction value Ic to the pre-correction command value IL* and sets a value after adding as the command current ILa*. According to the present embodiment, the command current ILa* corresponds to a current command value.

The current control unit 50 outputs a fifth gate signal GS5 that operates the fifth switch SW5 and a sixth gate signal GS6 that operates the sixth switch SW6 based on the reactor current ILr and the command current ILa*. The current control unit 50 includes a digital-to-analog (DA) converter 351, a comparator 352, an adder 353, a set-reset (RS) flip-flop 357, and a slope compensating unit 51. The command current ILa* is inputted to the DA converter 351.

The DA converter 351 converts the inputted command current ILa* from a digital value to an analog value. The command current ILa* that is converted to an analog value is inputted to an inverted input terminal of the comparator 352. The adder 353 adds the reactor current ILr and a slope compensation signal Slope that is set by the slope compensating unit 51 and outputs the compensated reactor current ILr. The output from the adder 353 is inputted to a non-inverted input terminal of the comparator 352. Here, the slope compensation signal Slope suppresses oscillation that accompanies variations in the current that flows to the reactor 13.

The comparator 352 compares the command current ILa* and the reactor current ILr, and inputs a low-state signal to an R terminal of the RS flip-flop 357 during a period in which the reactor current ILr is less than the command current ILa*. In addition, the comparator 352 inputs a high-state signal to the R terminal of the RS flip-flop during a period in which the reactor current ILr is greater than the command current ILa*. Furthermore, a clock signal is inputted to an S terminal of the RS flip-flop 357. A single cycle of the clock signal is a single switching cycle Tsw of the fifth and sixth switches SW5 and SW6.

A Q terminal of the RS flip-flop 357 is connected to a gate of the fifth switch SW5. A signal that is outputted from the Q terminal to the gate of the fifth switch SW5 is the fifth gate signal GS5. In addition, an output terminal of the RS flip-flop 357 is connected to a gate of the sixth switch SW6 with an inverter 358 therebetween. A signal that is outputted from the Q terminal to the gate of the sixth switch SW6 through the inverter 358 is the sixth gate signal GS6. The sixth gate signal GS6 is a value that is the fifth gate signal GS of which a logic is inverted.

The control apparatus 30 includes a polarity determining unit 55 that determines the polarity of the actual voltage Vr based on the detected voltage Vac. The polarity determining unit 55 outputs a high-state polarity determination signal PS during a period in which the polarity of the actual voltage Vr is determined to be a positive polarity. Meanwhile, the polarity determining unit 55 outputs a low-state polarity determination signal PS during a period in which the polarity of the actual voltage Vr is determined to be a negative polarity. Here, a detailed configuration of the polarity determining unit 55 will be described hereafter.

The polarity determination signal PS from the polarity determining unit 55 is inputted to an operating unit 56. The operating unit 56 supplies the polarity determination signal PS to gates of the first and fourth switches SW1 and SW4 with the logic thereof maintained as is. Therefore, the polarity determination signal PS that is outputted from the operating unit 56 to the gate of the first switch SW1 is a first gate signal GS1 and the polarity determination signal PS that is outputted from the operating unit 56 to the gate of the fourth switch SW4 is a fourth gate signal GS4. The polarity determination signal PS from the polarity determining unit 55 is also inputted to an inverter 359 that is provided in the operating unit 56. The polarity determination signal PS is inputted to gates of the second and third switches SW2 and SW3 in a state in which the logic is inverted by the inverter 359. A signal that is outputted from the inverter 359 to the gate of the second switch SW2 is a second gate signal GS2 and a signal that is outputted from the inverter 359 to the gate of the third switch SW3 is a third gate signal GS3.

Figure 5:
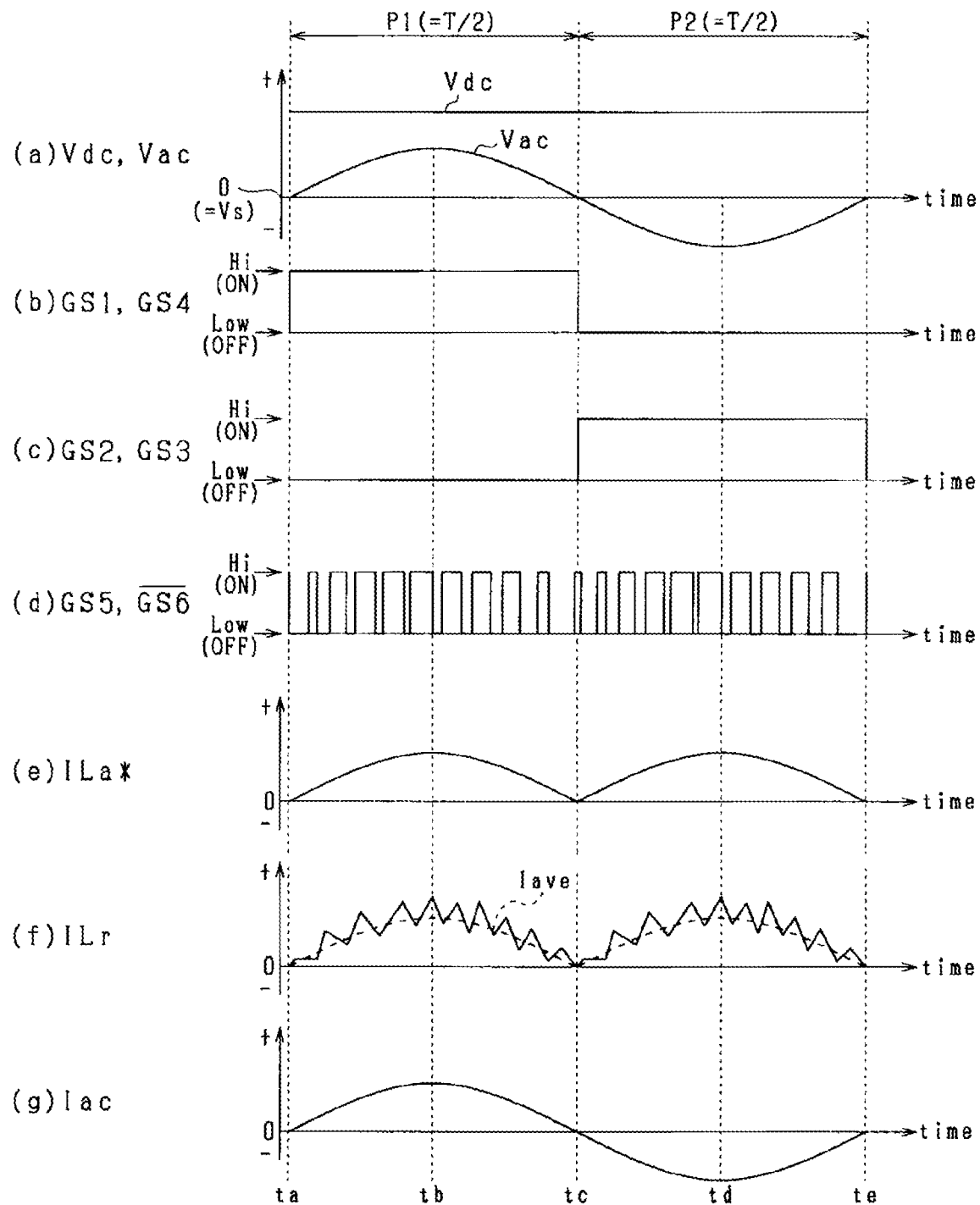
FIG. 5 is a timing chart for explaining operations of the power conversion apparatus.

Next, operations of the power conversion apparatus 100 will be described with reference to FIG. 5. FIG. 5 shows, in (a), transitions in the detected voltage Vac and the direct-current voltage Vdc. FIG. 5 shows, in (b), transitions in the first and fourth gate signals GS1 and GS4. FIG. 5 shows, in (c), transitions in the second and third gate signals GS2 and GS3. FIG. 5 shows, in (d), transitions in the fifth gate signal GS5 and a signal that is the inverted sixth gate signal GS6. FIG. 5 shows, in (e), transitions in the command current ILa*. FIG. 5 shows, in (f), transitions in the reactor current ILr. FIG. 5 shows, in (g), transitions in the output current Iac.

The command current ILa* that is calculated by the control apparatus 30 has a waveform in which a positive half-wave of a positive sine wave is repeated at a cycle T/2. In FIG. 5, the command current ILa* changes in value based on a waveform of the detected voltage Vac In a single cycle T of the detected voltage Vac, during a first period P1 (=T/2) in which the detected voltage Vac is positive, the first and fourth gate signals GS1 and GS4 are in a high state, and the second and third gate signals GS2 and GS3 are in a low state. As a result, in the full-bridge circuit 12, the first and fourth switches SW1 and SW4 are in an on state, and the second and third switches SW2 and SW3 are in an off state. During the first period P1, the control apparatus 30 changes a duty ratio (=Ton/Tsw) that indicates a ratio of an on period in a single switching cycle Tsw of the fifth and sixth gate signals GS5 and GS6 to control the reactor current ILr to the command current ILa* by peak-current-mode control. At this time, the reactor current ILr during the single switching cycle Tsw is a value that is based on the duty ratio of the fifth switch. Therefore, an average value Iave of the reactor current ILr is a value that is close to the command current ILa*.

During a second period P2 (=T/2) in which the detected voltage Vac is negative, the first and fourth gate signals GS1 and GS4 are in a low state, and the second and third gate signals GS2 and GS3 are in a high state. As a result, in the full-bridge circuit 12, the first and fourth switches SW1 and SW4 are in the off state, and the second and third switches SW2 and SW3 are in the on state. During the second period P2 as well, the control apparatus 30 changes the duty ratio of the fifth and sixth gate signals GS5 and GS6 to control the reactor current ILr to the command current ILa* by peak-current-mode control.

A phase shift may occur in the detected voltage Vac in relation to the actual voltage Vr. The phase shift in the detected voltage Vac in relation to the actual voltage Vr occurs as a result of manufacturing variations in elements that configure the alternating-current voltage sensor 23 and temperature characteristics thereof. In addition, the phase shift in the detected voltage Vac in relation to the actual voltage Vr also occurs as a result of the lowpass filter 243 that is provided in the difference amplifying unit 233 of the alternating-current voltage sensor 23 acting as a capacitance component.

As a result of the phase shift in the detected voltage Vac in relation to the actual voltage Vr, a timing at which the detected voltage Vac becomes the reference voltage Vs is shifted from the zero-cross timing of the actual voltage Vr. As a result, a switching timing of the on/off operations of the first to fourth switch elements SW1 to SW4 that configure the full-bridge circuit 12 may shift from the timing at which the polarity of the actual voltage Vr is switched. An over-current may flow to the first and second alternating-current-side terminals TA1 and TA2.

Figure 6:
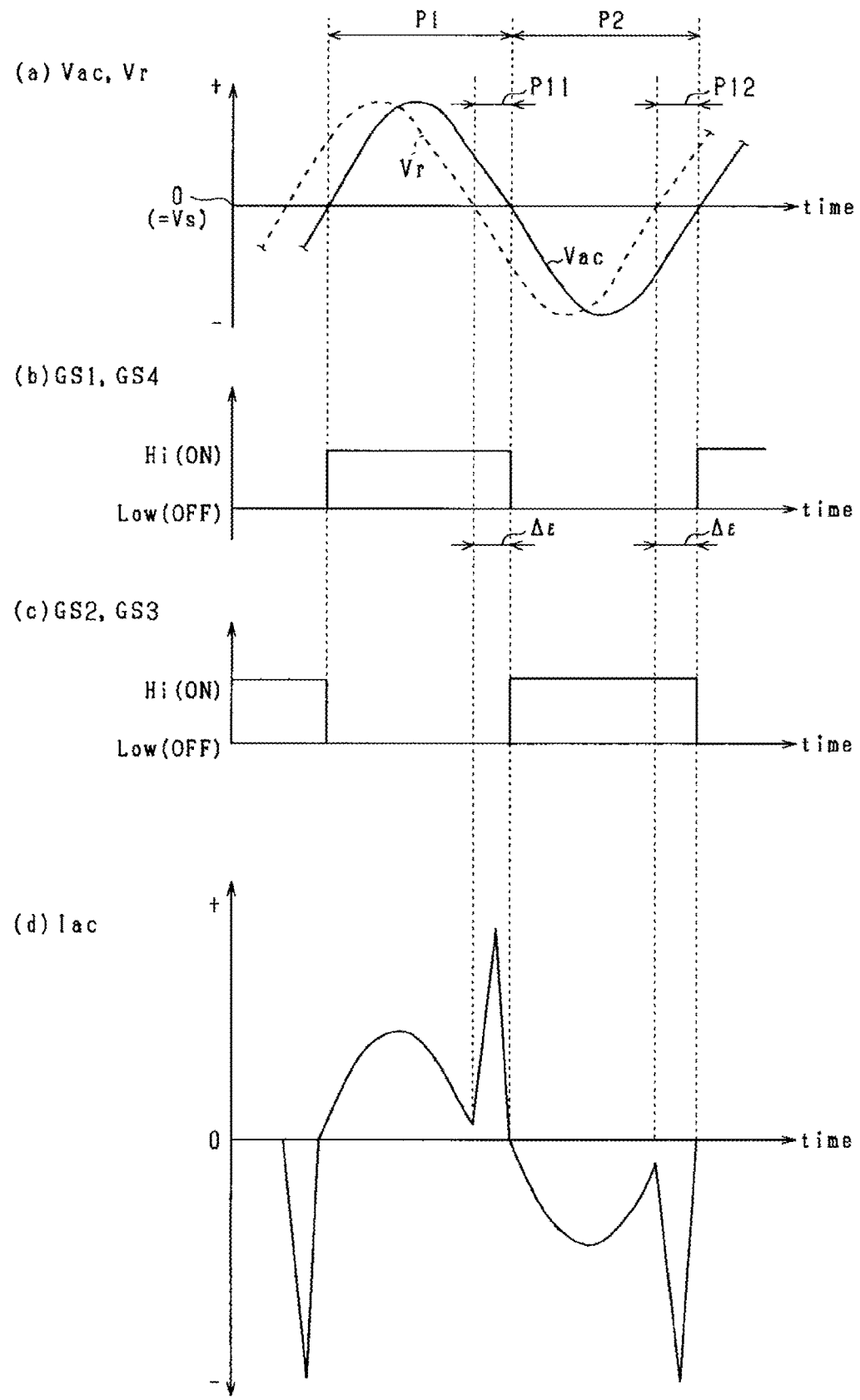
FIG. 6 is a diagram for explaining details of an overcurrent that flows to first and second alternating-current-side terminals.
Figure 7:
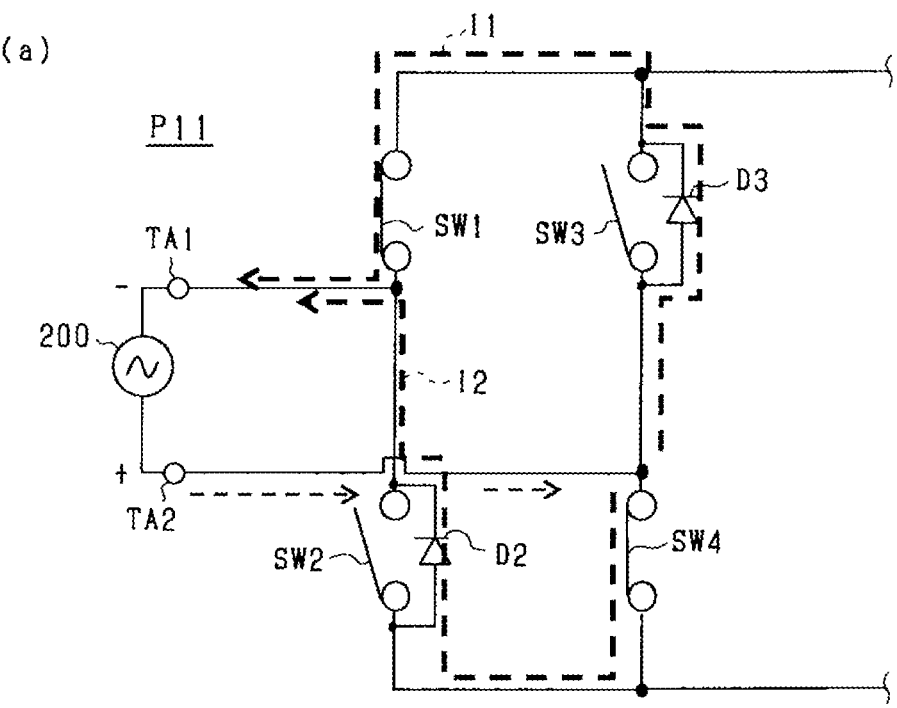
FIG. 7 is a diagram for explaining details of the overcurrent that flows to first and second alternating-current-side terminals.
Figure 7:
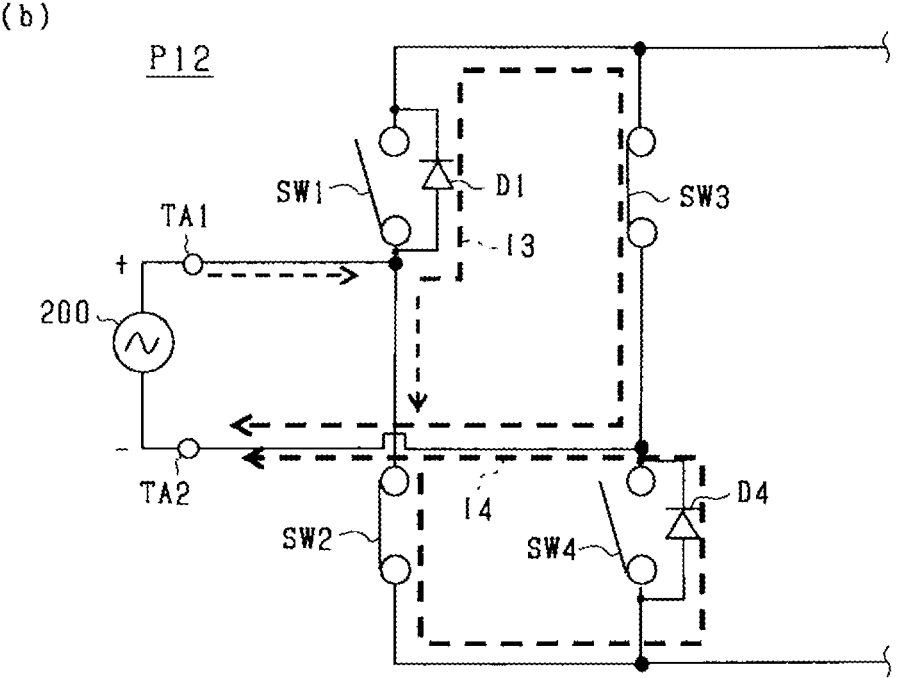

Details of the overcurrent that flows to the first and second alternating-current-side terminals TA1 and TA2 will be described with reference to FIG. 6 and FIG. 7. FIG. 6 shows, in (a), transitions in the detected voltage Vac and the actual voltage Vr. FIG. 6 shows, in (b), transitions in the first and fourth gate signals GS1 and GS4. FIG. 6 shows, in (c), transitions in the second and third gate signals GS2 and GS3. FIG. 6 shows, in (d), transitions in the output current Iac. FIG. 7 shows, in (a), a flow path of a current that flows to the full-bridge circuit 12 and the alternating-current power supply 200 during a period P11 in FIG. 6. Here, to facilitate description, FIG. 6 shows, in (a), the detected voltage Vac and the actual voltage Vr when the reference voltage Vs is zero. FIG. 7 shows, in (b), a diagram for explaining a current that flows to the full-bridge circuit 12 and the alternating-current power supply 200 during a period P12 in FIG. 6.

The phase of the detected voltage Vac indicated by a solid line in FIG. 6 by (a) is later than the phase of the actual voltage Vr indicated by a broken line. As a result, during the first period P11 in which the detected voltage Vac is positive, a falling timing of the first and fourth gate signals GS1 and GS4 is delayed by Δε from the zero-cross timing of the actual voltage Vr. In addition, a rising timing of the second and third gate signals GS2 and GS3 is delayed by Δε from the zero cross timing of the actual voltage Vr. Furthermore, during the period P11, whereas the actual voltage Vr is negative, the detected voltage Vac detected by the alternating-current voltage sensor 23 is a value that is higher than zero (reference voltage Vs).

As shown in FIG. 7 by (a), during the period P11, as a result of the negative actual voltage Vr that is applied between the first and second alternating-current-side terminals TA1 and TA2, a first current I1 flows to a closed circuit that includes the body diode D3 of the third switch SW3 and a section between the drain and the source of the first switch SW1, in a direction from the first alternating-current-side terminal TA1 to the second alternating-current-side terminal TA2 through the alternating-current power supply 200.

In a similar manner, as a result of the negative actual voltage Vr, a second current I2 flows to a closed circuit that includes a section between the drain and the source of the fourth switch SW4, and the body diode D2 of the second switch SW2, in a direction from the first alternating-current-side terminal TA1 to the second alternating-current-side terminal TA2 through the alternating-current power supply 200. Therefore, as shown in FIG. 6 by (d), during the period P11, the first current I1 and the second current I2 are added together, and an overcurrent flows.

Returning to the description regarding FIG. 6, during the period P12, the rising timing of the first and fourth gate signals GS1 and GS2 is delayed by Δε from the zero-cross timing of the actual voltage Vr. In addition, during the period P12, the falling timing of the second and third gate signals GS2 and GS3 is delayed by Δε from the zero-cross timing of the actual voltage Vr. Furthermore, during the period P12, whereas the actual voltage Vt is positive, the detected voltage Vac detected by the alternating-current voltage sensor 23 is negative and less than zero (reference voltage Vs).

As shown in FIG. 7 by (b), during the period P12, as a result of the positive actual voltage Vr that is applied between the first and second alternating-current-side terminals TA1 and TA2, a third current I3 flows to a closed circuit that includes the body diode D1 of the first switch SW1 and a section between the drain and the source of the third switch SW3, in a direction from the second alternating-current-side terminal TA2 to the first alternating-current-side terminal TA1 through the alternating-current power supply 200.

In a similar manner, as a result of the positive actual voltage Vr, a fourth current I4 flows to a closed circuit that includes a section between the drain and the source of the second switch SW2, and the body diode D4 of the fourth switch SW4, in a direction from the second alternating-current-side terminal TA2 to the first alternating-current-side terminal TA1 through the alternating-current power supply 200. Therefore, during the period P12, the third current I3 and the fourth current I4 are added together, and an overcurrent flows.

When the phase shift in the detected voltage Vac in relation to the actual voltage Vr occurs, the detected voltage Vac at the zero-cross timing of the actual voltage Vr is a value that differs from the reference voltage Vs. In FIG. 6 by (a), the detected voltage Vac is a value that is lower than the reference voltage Vs at a zero-up-crossing timing of the actual voltage Vr and a value that is higher than the reference voltage Vs at a zero-down-crossing timing of the actual voltage Vr. Here, according to the present embodiment, a determination value that is used in polarity determination of the actual voltage Vr is prescribed taking into consideration the phase shift in the detected voltage Vac in relation to the actual voltage Vr.

Returning to the description regarding FIG. 3, the polarity determining unit 55 according to the present embodiment includes a first-determination-value outputting unit 60, a second-determination-value outputting unit 61, a first comparing unit 62, a second comparing unit 63, and a determination signal outputting unit 64.

Figure 8:
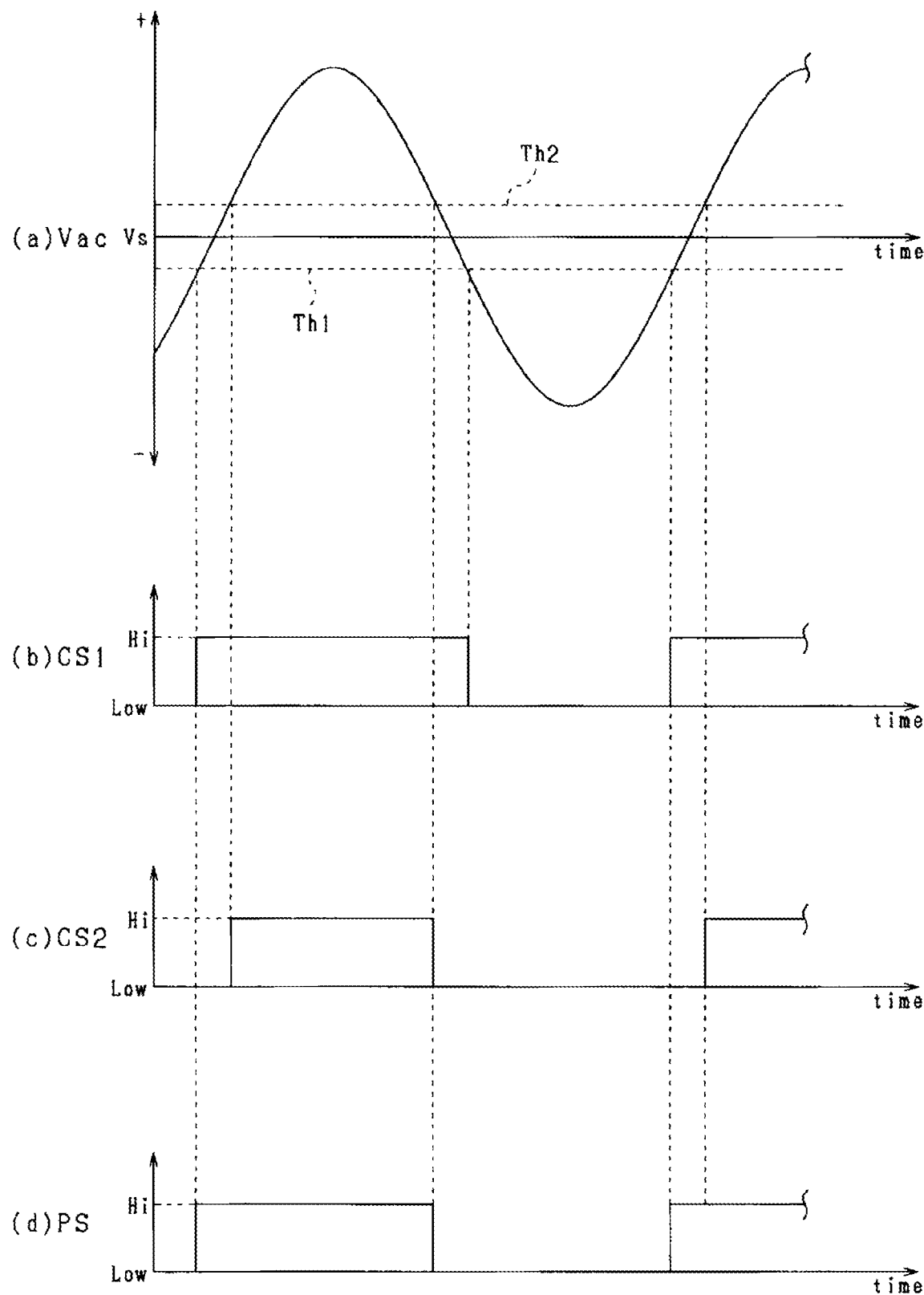
FIG. 8 is a diagram for explaining first and second determination values.

The first-determination-value outputting unit 60 outputs a first determination value Th1 that is used in the polarity determination of the actual voltage Vr. The first determination value Th1 is a voltage value for determining that the phase of the actual voltage Vr is the zero-up-crossing timing. According to the present embodiment, as shown in FIG. 8 by (a), the first determination value Th1 is prescribed as a value that is less than the reference voltage Vs. The second-determination-value outputting unit 61 outputs a second determination value Th2 that is used in the polarity determination of the actual voltage Vr. The second determination value Th2 is a voltage value for determining that the phase of the actual voltage Vr is the zero-down-crossing timing. According to the present embodiment, as shown in FIG. 8 by (a), the second determination value Th2 is prescribed as a value that is greater than the reference voltage Vs.

The detected voltage Vac is inputted to a non-inverted input terminal of the first comparing unit 62, and the first determination value Th1 is inputted to an inverted input terminal.

As shown in FIG. 8 by (b), the first comparing unit 62 outputs a high-state first comparison signal CS1 when the detected voltage Vac is greater than the first determination value Th1 and outputs a low-state first comparison signal CS1 when the detected voltage Vac is equal to or less than the first determination value Th1. The detected voltage Vac is inputted to a non-inverted input terminal of the second comparing unit 63 and the second determination value Th2 is inputted to an inverted input terminal.

As shown in FIG. 8 by (c), the second comparing unit 3 outputs a high-state second comparison signal CS2 when the detected voltage Vac is greater than the second determination value Th2 and outputs a low-state second comparison signal CS2 when the detected voltage Vac is equal to or less than the second determination value Th2.

The first comparison signal CS1 and the second comparison signal CS2 are inputted to the determination signal outputting unit 64. As shown in FIG. 8 by (d), the determination signal outputting unit 64 changes the polarity determination signal PS from a low state to a high state when the first comparison signal CS1 is switched from a low state to a high state. The determination signal outputting unit 64 changes the polarity determination signal PS from a high state to a low state when the second comparison signal CS2 is switched from a high state to a low state.

Therefore, the determination signal outputting unit 64 determines a period from when the detected voltage Vac exceeds the first determination value Th1 until the detected voltage Vac falls below the second determination value Th2 to be a period during which the actual voltage Vr has a positive polarity. The determination signal outputting unit 64 determines a period from when the detected voltage Vac falls below the second determination value Th2 until the detected voltage Vac exceeds the first determination value Th1 to be a period during which the actual voltage Vr has a negative polarity.

Figure 9:
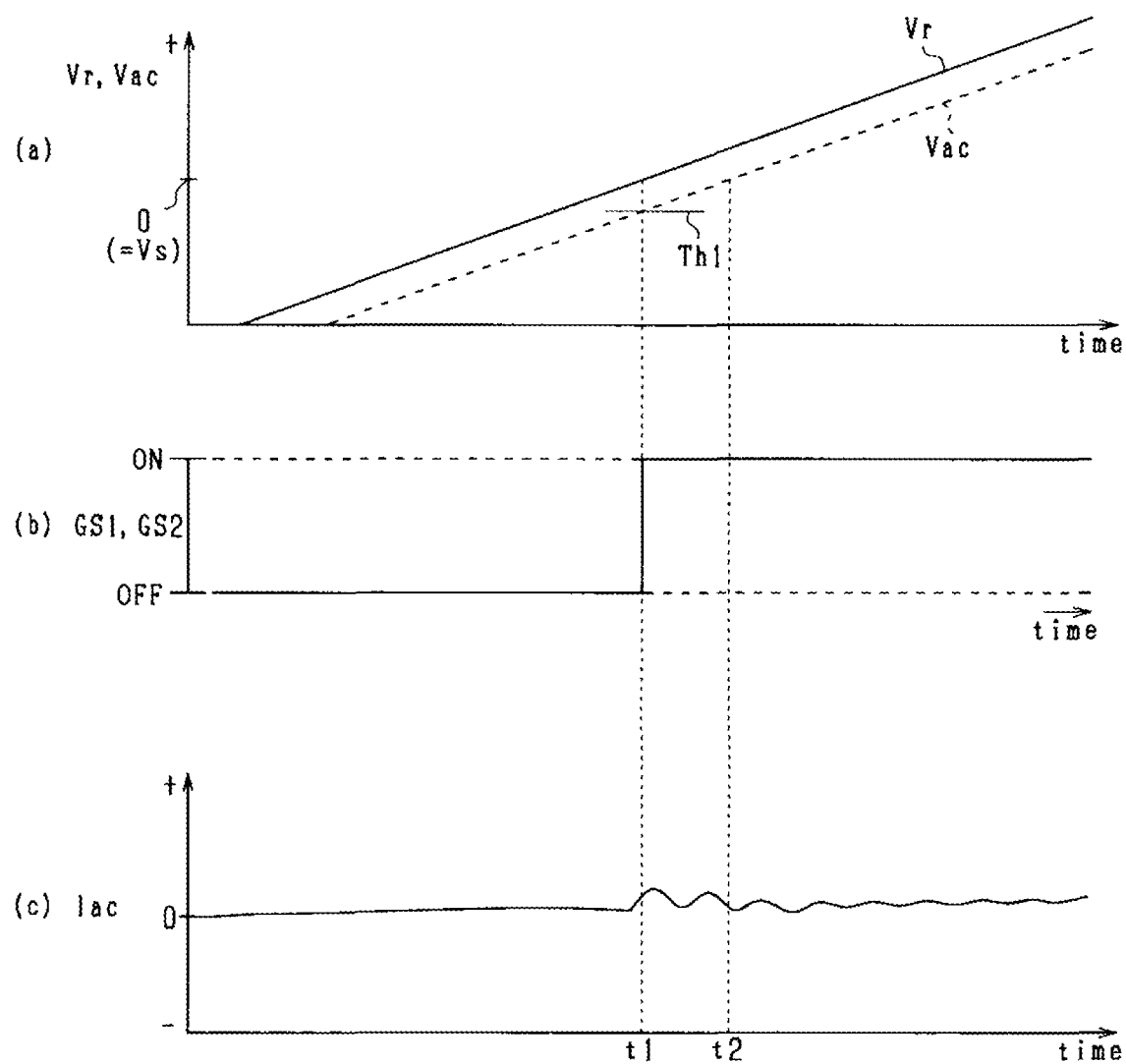
FIG. 9 is a diagram for explaining working effects according to a present embodiment.

Next, working effects according to the present embodiment will be described with reference to FIG. 9 and FIG. 10. FIG. 9 shows, in (a), transitions in the detected voltage Vac near the zero-up-crossing timing of the actual voltage Vr. FIG. 9 shows, in (b), transitions in the first gate signal GS1 and the second gate signal GS2. Here, in FIG. 9 in (b), the second gate signal GS2 is indicated by a broken line. FIG. 9 shows, in (c), changes in the output current Iac that flows to the full-bridge circuit 12. Here, to facilitate description, FIG. 9 shows, in (a), the actual voltage Vr and the detected voltage Vac when the reference voltage Vs is zero.

At time t1, the phase of the actual voltage Vr is the zero-up-crossing timing. The phase of the detected voltage Vac is delayed in relation to that of the actual voltage Vr. At time t1, the detected voltage Vac remains a value that is lower than the reference voltage Vs. Subsequently, at time t2, the detected voltage Vac increases to the reference voltage Vs. During a period from time t1 to time t2, whereas the actual voltage Vr has a positive polarity, the detected voltage Vac is a value that is lower than the reference voltage Vs.

According to the present embodiment, the first determination value Th1 is prescribed as a value that is lower than the reference voltage Vs. Therefore, as a result of the detected voltage Vac exceeding the first determination value Th1 after time t1, the actual voltage Vr is determined to have a positive polarity. Therefore, after time t1, the first gate signal GS1 enters a high state and the second gate signal GS2 enters a low state in time with the switching timing of the polarity of the actual voltage Vr. As a result, an overcurrent flowing to the full-bridge circuit 12 is suppressed.

Figure 10:
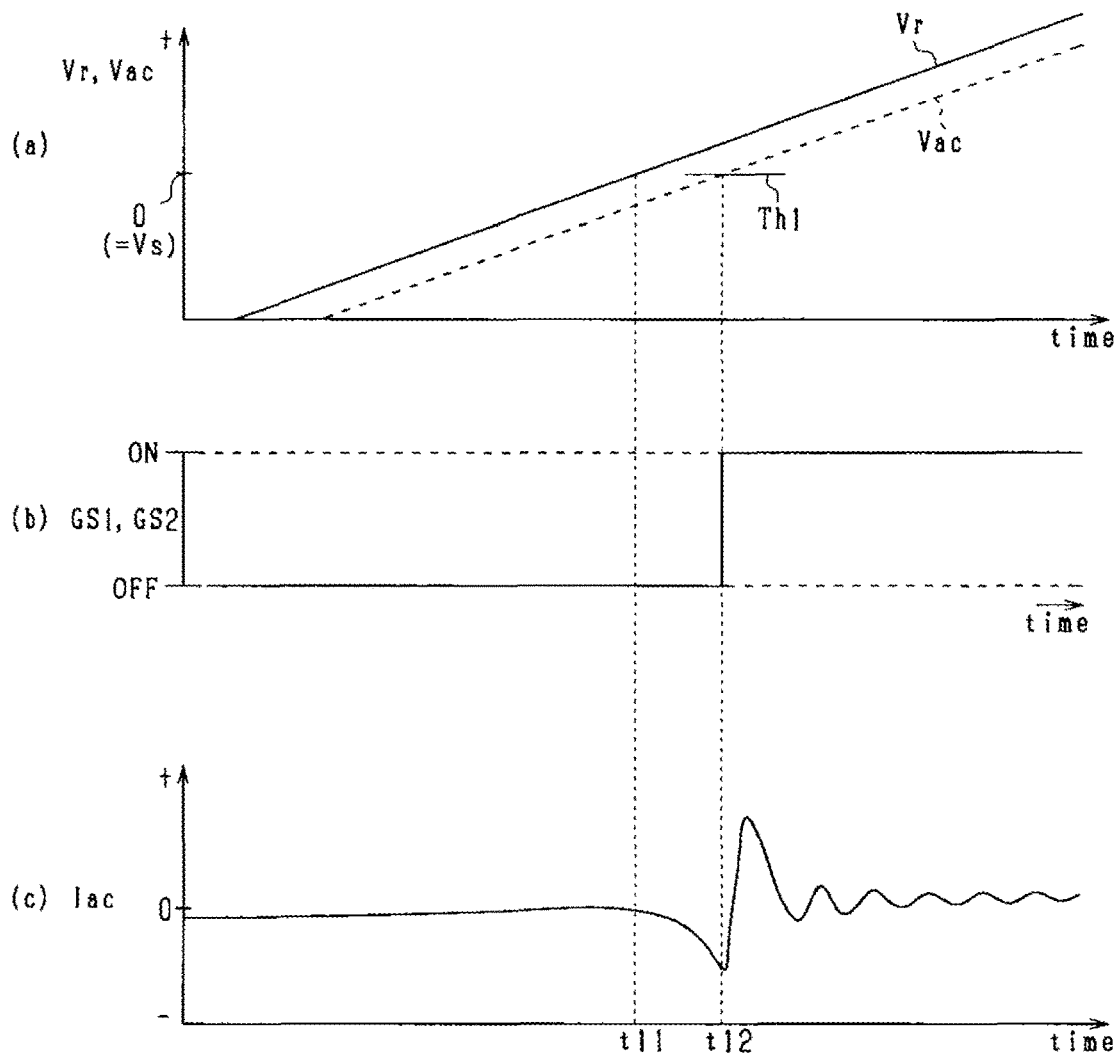
FIG. 10 is a diagram for explaining working effects of a comparison example.

FIG. 10 is a diagram of a process of the control apparatus 30 in a comparison example. The comparison example is a configuration in which the first and second determination values Th1 and Th2 are the reference value Vs. Here, (a) to (c) in FIG. 10 respectively correspond to (a) to (c) in FIG. 9. In the comparison example shown in FIG. 10 as well, at time t11, the phase of the actual voltage Vr is the zero-up-crossing timing. During a period from time t11 to time t12, the detected voltage Vac is a value that is lower than the reference voltage Vs.

In the comparison example, the first determination value Th1 is the reference voltage Vs. Therefore, during the period from time t11 to time t12, the detection value Vac is less than the first determination value Th1 and the actual voltage Vr is determined to have a negative polarity. That is, during the period from time t11 to time t12, whereas the actual voltage Vr has a positive polarity, a determination result regarding the actual voltage Vr by the polarity determining unit 55 indicates a negative polarity. Therefore, the first gate signal GS1 is in a low state and the second gate signal GS2 is in a high state. An overcurrent flows to the full-bridge circuit 12.

Next, a method for generating a reference-correction-value map described with reference to FIG. 3 above will be described with reference to FIG. 11.

According to the present embodiment, the deviation width Δi is a value that is obtained by the average value Iave of the reactor current ILr being subtracted from the pre-correction command current IL*. Here, in FIG. 11, D denotes a duty ratio of the on period of the fifth switch SW5.

Figure 11:
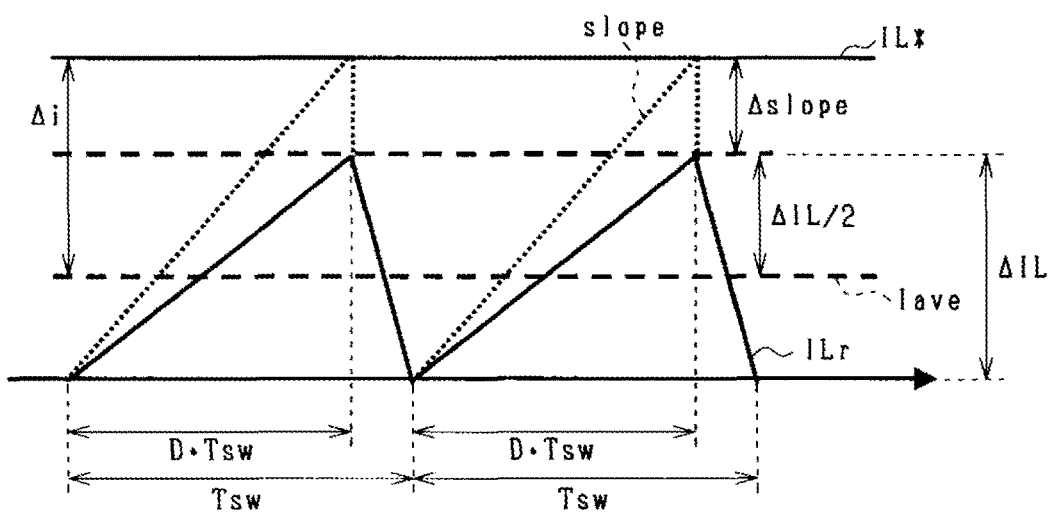
FIG. 11 is a diagram for explaining a method for generating a reference-correction-value map.

As shown in FIG. 11, the deviation width Δi can be considered to be that obtained by a value (ΔIL/2) that is half of a maximum amount of increase ΔIL of the reactor current ILr being added to a maximum amount of increase Δslope of the slope compensation signal Slope during the on period (=D×Tsw). Therefore, the deviation width Δi is calculated by expression (1) below.

$$\Delta i = IL^* - Iave = \Delta slope + \Delta IL/2 \tag{2}$$

In addition, the maximum amount of increase ΔIL of the reactor current ILr can be calculated by expression (3) below, using a voltage that is generated at both ends of the reactor 13 and an inductance L of the reactor 13.

$$\Delta IL = \frac{Vdc - \sqrt{2}\, Vrms \cdot |\sin\theta|}{L} \cdot D \cdot Tsw \tag{3}$$

Furthermore, the maximum amount of increase Δslope of the slope compensation signal Slope can be calculated by expression (4) below.

$$\Delta slope = ms \times D \times Tsw \tag{4}$$

For example, as a gradient ms of the slope compensation signal Slope when the deviation width Δi is calculated, an average value of the gradient ms may be used.

The duty ratio D of the on period of the fifth switch SW5 can be calculated by expression (5) below, using the effective value Vrms of the detected voltage Vac.

$$D = \frac{\sqrt{2}\, Vrms \cdot |\sin\theta|}{Vdc} \tag{5}$$

The deviation width Δi is calculated as expression (1) above, by expressions (2) to (5) above. According to the present embodiment, the reference correction value Ih is calculated using the deviation width Δi shown in expression (1) above. For example, a value that is obtained by the deviation width Δi being multiplied by a calculation coefficient α can be used as the reference correction value Ih. Here, the calculation coefficient α can be a value that is greater than 0 and equal to or less than 1. Then, the reference-correction-value map can be generated by the calculated reference correction value Ih being recorded for each effective value Vrms.

According to the present embodiment described above, following effects can be achieved.

The control apparatus 30 performs the polarity determination of the actual voltage Vr using the first and second determination values Th1 and Th2 that are values that differ from the reference voltage Vs of the alternating-current voltage sensor 23. The control apparatus 30 determines that the period from when the detected voltage Vac exceeds the first determination value Th1 until the detected voltage Vac falls below the second determination value Th2 is the period during which the actual voltage Vr has a positive polarity, and the period from when the detected voltage Vac falls below the second determination value Th2 until the detected voltage Vac exceeds the first determination value Th1 is the period during which the actual voltage Vr has a negative polarity.

As a result, even when a phase shift in the detected voltage Vac in relation to the actual voltage Vr occurs, the operation timing of the set that is set to an ON state, of the set of the first and fourth switches SW1 and SW4 and the set of the second and third switches SW2 and SW3, being shifted from the timing at which the polarity of the actual voltage Vr is switched is suppressed. As a result, an overcurrent can be prevented from flowing to the alternating-current-side terminals TA1 and TA2 of the power conversion apparatus 100.

Variation Examples According to the First Embodiment

The reference voltage generating unit 231 is merely required to be that which generates the reference voltage Vs. The reference voltage generating unit 231 is not limited to a voltage dividing circuit in which resistors are used and may be a switching power supply.

Second Embodiment

According to a second embodiment, configurations that differ from those according to the first embodiment are mainly described. Here, configurations that are given the same reference numbers as those according to the first embodiment indicate identical configurations. Descriptions thereof are not repeated.

According to the present embodiment, the first and second determination values Th1 and Th2 are variably set taking into consideration differences in amplitude and frequency of the detected voltage Vac, and further, changes in the detected voltage Vac due to sudden voltage variations in the actual voltage Vr.

Figure 12:
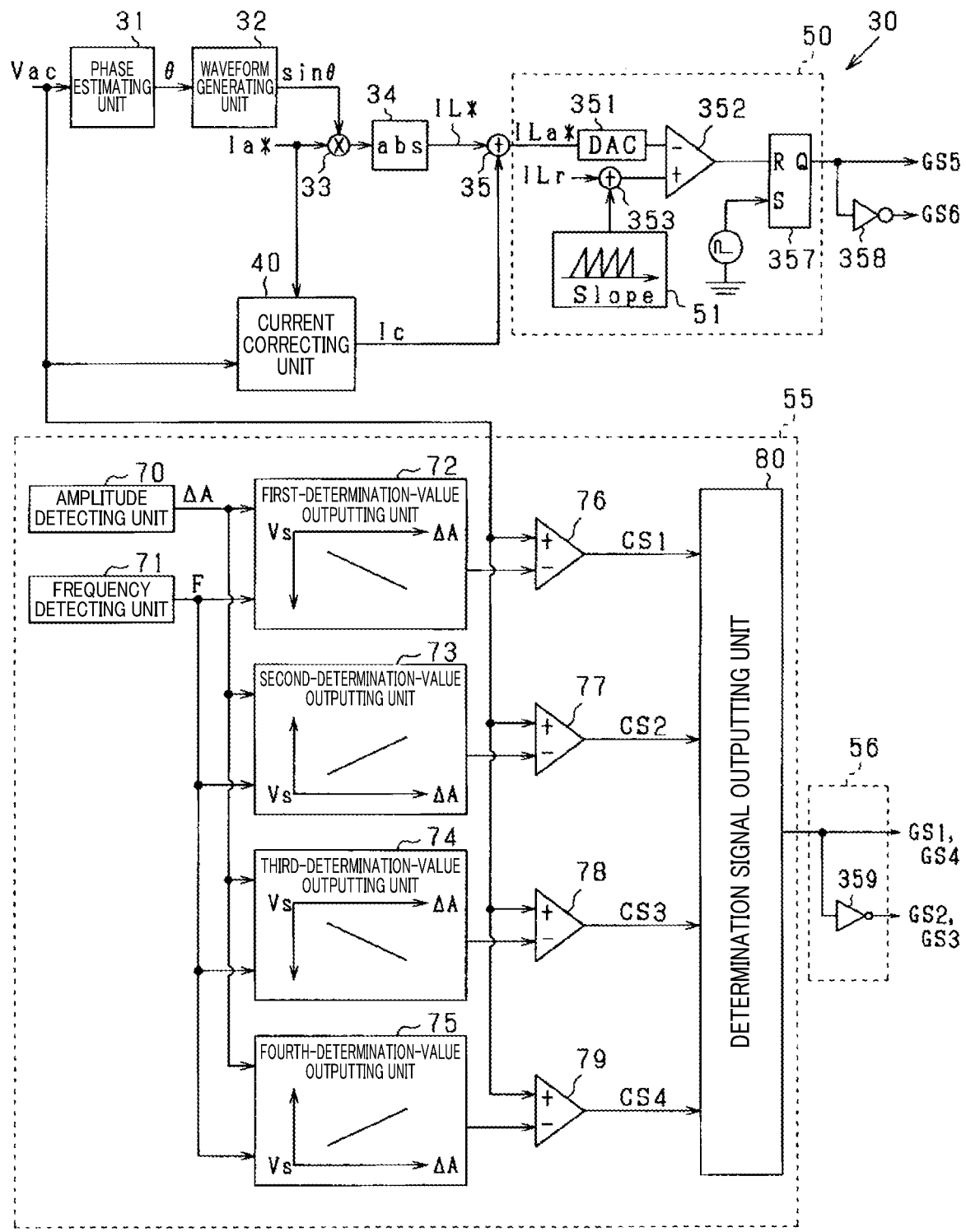
FIG. 12 is a functional block diagram of a control apparatus according to a second embodiment.

As shown in FIG. 12, the polarity determining unit 55 according to the present embodiment includes an amplitude detecting unit 70, a frequency detecting unit 71, a first-determination-value outputting unit 72, a second-determination-value outputting unit 73, a third-determination-value outputting unit 74, a fourth-determination-value outputting unit 75, a first comparing unit 76, a second comparing unit 77, a third comparing unit 78, a fourth comparing unit 79, and a determination signal outputting unit 80.

The amplitude detecting unit 70 detects an amplitude ΔA of the detected voltage Vac. For example, the amplitude detecting unit 70 may detect a difference between a maximum value or a minimum value, and a median value as the amplitude ΔA of the detected voltage Vac in a single cycle T of the detected voltage Vac detected by the alternating-current voltage sensor 23.

The frequency detecting unit 71 detects a frequency F of the detected voltage Vac based on the detected voltage Vac. According to the present embodiment, an output frequency of the alternating-current power supply 200 is either of a first frequency and a second frequency that is higher than the first frequency. According to the present embodiment, as an example, the first frequency is 50 Hz and the second frequency is 60 Hz.

The first-determination-value outputting unit 72 sets the first determination value Th1 (≤Vs) to a smaller value as the amplitude ΔA that is detected by the amplitude detecting unit 70 increases. This is because the gradient of the detected voltage Vac increases as the amplitude ΔA increases, and the deviation width from the reference voltage Vs to the detected voltage Vac that is detected at the zero-up-crossing timing of the actual voltage Vr increases towards the negative side.

Figure 13:
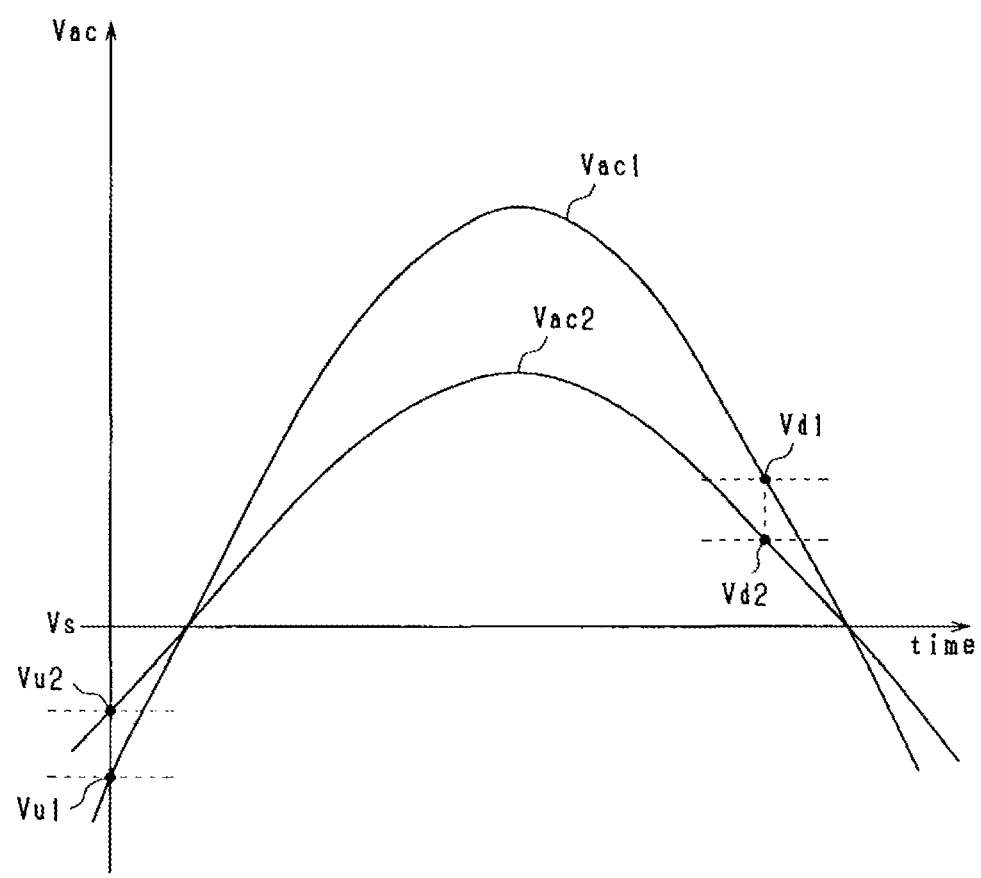
FIG. 13 is a diagram for explaining a manner in which a detected voltage that corresponds to a zero-cross timing of an actual voltage changes in accompaniment with changes in amplitude.

In FIG. 13, voltages that correspond to the zero-up-crossing timing of the actual voltage Vr of two detected voltages Vac1 and Vac2 of which the amplitudes ΔA differ are denoted as zero-up-side detected voltages Vu1 and Vu2. The zero-up-side detected voltage Vu1 of the detected voltage Vac1 that has the greater amplitude is a value that is smaller than the zero-up-side detected voltage Vu2 of the detected voltage Vac2 that has the smaller amplitude.

The second-determination-value outputting unit 73 sets the second determination value Th2 to a greater value as the amplitude ΔA that is detected by the amplitude detecting unit 70 increases. This is because the gradient of the detected voltage Vac increases as the amplitude ΔA increases, and the deviation width from the reference voltage Vs to the detected voltage Vac that is detected at the zero-down-crossing timing of the actual voltage Vr increases towards the positive side.

In FIG. 13, voltages that correspond to the zero-down-crossing timing of the actual voltage Vr of the two detected voltages Vac1 and Vac2 of which the amplitudes ΔA differ are denoted as zero-down-side detected voltages Vd1 and Vd2. The zero-down-side detected voltage Vd1 of the detected voltage Vac1 that has the greater amplitude is a value that is greater than the zero-down-side detected voltage Vd2 of the detected voltage Vac2 that has the smaller amplitude.

The first-determination-value outputting unit 72 variably sets the first determination voltage Th1 based on the frequency F that is detected by the frequency detecting unit 71. In addition, the second-determination-value outputting unit 73 variably sets the second determination voltage Th2 based on the frequency F that is detected by the frequency detecting unit 71. This is because the gradient of the detected voltage Vac changes based on the frequency F of the detected voltage Vac, and the zero-down-side detected voltage and the zero-up-side detected voltage are differing values.

The third-determination-value outputting unit 74 outputs a third determination value Th3 that is an intermediate determination value between the first determination value Th1 and the second determination value Th2. The third determination value Th3 is set in preparation for a case in which the detection value Vac changes to decreasing without sufficiently increasing after exceeding the first determination threshold Th1, as a result of sudden voltage variations in the actual voltage Vr. When the detected voltage Vac does not fall below the second determination value Th2 during a next half-cycle (=T/2), the polarity of the actual voltage Vr remains erroneously determined. The overcurrent continues to flow to the power conversion apparatus 100.

The fourth-determination-value outputting unit 57 outputs a fourth determination value Th4 that is an intermediate determination value between the first determination value Th1 and the second determination value Th2. The fourth determination value Th4 is set in preparation for a case in which the detection value Vac changes to increasing without sufficiently decreasing after falling below the second determination threshold Th2, as a result of sudden voltage variations in the actual voltage Vr. When the detected voltage Vac does not exceed the first determination value Th1 during a next half-cycle, the polarity of the actual voltage Vr remains erroneously determined. The overcurrent continues to flow to the power conversion apparatus 100.

According to the present embodiment, the third determination value Th3 is prescribed as a value that is lower than the reference voltage Vs and the fourth determination value Th4 is prescribed as a value that is higher than the reference voltage Vs. The third-determination-value outputting unit 74 sets the third determination value Th3 to a smaller value as the detected amplitude ΔA increases. The fourth-determination-value outputting unit 75 sets the fourth determination value Th4 to a greater value as the detected amplitude ΔA increases. The third- and fourth-determination-value outputting units 74 and 75 variably set the third and fourth determination values Th3 and Th4 based on the detected frequency F.

According to the present embodiment, the first to fourth-determination-value outputting units 72 to 75 include a determination value map that indicates relationships between combinations of the amplitude ΔA and the frequency F of the detected voltage Vac and the first to fourth determination values Th1 to Th4. The first to fourth-determination-value outputting units 72 to 75 can output the first to fourth determination values Th1 to Th4 based on the combination of the amplitude ΔA and the frequency F of the detected voltage Vac by referencing the determination value map.

The detected voltage Vac and the first determination value Th1 are inputted to the first comparing unit 76, and the detected voltage Vac and the second determination value Th2 are inputted to the second comparing unit 77. The detected voltage Vac is inputted to a non-inverted input terminal of the third comparing unit 78 and the third determination value Th3 is inputted to an inverted input terminal. The detected voltage Vac is inputted to a non-inverted input terminal of the fourth comparing unit 79 and the fourth determination value Th4 is inputted to an inverted input terminal.

The third comparing unit 78 outputs a high-state third comparison signal CS3 when the detected voltage Vac is a value that is greater than the third determination value Th3, and outputs a low-state third comparison signal CS3 when the detected voltage Vac is equal to or less than the third determination value Th3. The fourth comparing unit 79 outputs a high-state fourth comparison signal CS4 when the detected voltage Vac is a value that is greater than the fourth determination value Th4, and outputs a low-state fourth comparison signal CS4 when the detected voltage Vac is equal to or less than the fourth determination value Th4.

The first to fourth comparison signals CS1 to CS4 from the first to fourth comparing units 76 to 79 are inputted to the determination signal outputting unit 80. The determination signal outputting unit 80 changes the polarity determination signal PS from a low state to a high state when the first comparison signal CS1 changes from a low state to a high state. In addition, the determination signal outputting unit 80 changes the polarity determination signal PS from a high state to a low state when the second comparison signal CS2 changes from a high state to a low state.

The determination signal outputting unit 80 changes the polarity determination signal PS from a high state to a low state when the third comparison signal CS3 changes from a high state to a low state when the first comparison signal CS1 is in a high state. As a result, when the detected voltage Vac falls below the third determination value without falling below the second determination value Th2 after exceeding the first determination value Th1, the determination signal outputting unit 80 changes the polarity determination signal PS to a low state, and the actual voltage Vr is determined to have switched from a positive polarity to a negative polarity.

The determination signal outputting unit 80 changes the polarity determination signal PS from a low state to a high state when the fourth comparison signal CS4 changes from a low state to a high state when the second comparison signal CS2 is in a low state. As a result, when the detected voltage Vac exceeds the fourth determination value Th4 without exceeding the first determination value Th1 after falling below the second determination value Th2, the determination signal outputting unit 80 changes the polarity determination signal PS to a high state, and the actual voltage Vr is determined to have switched from a negative polarity to a positive polarity.

Figure 14:
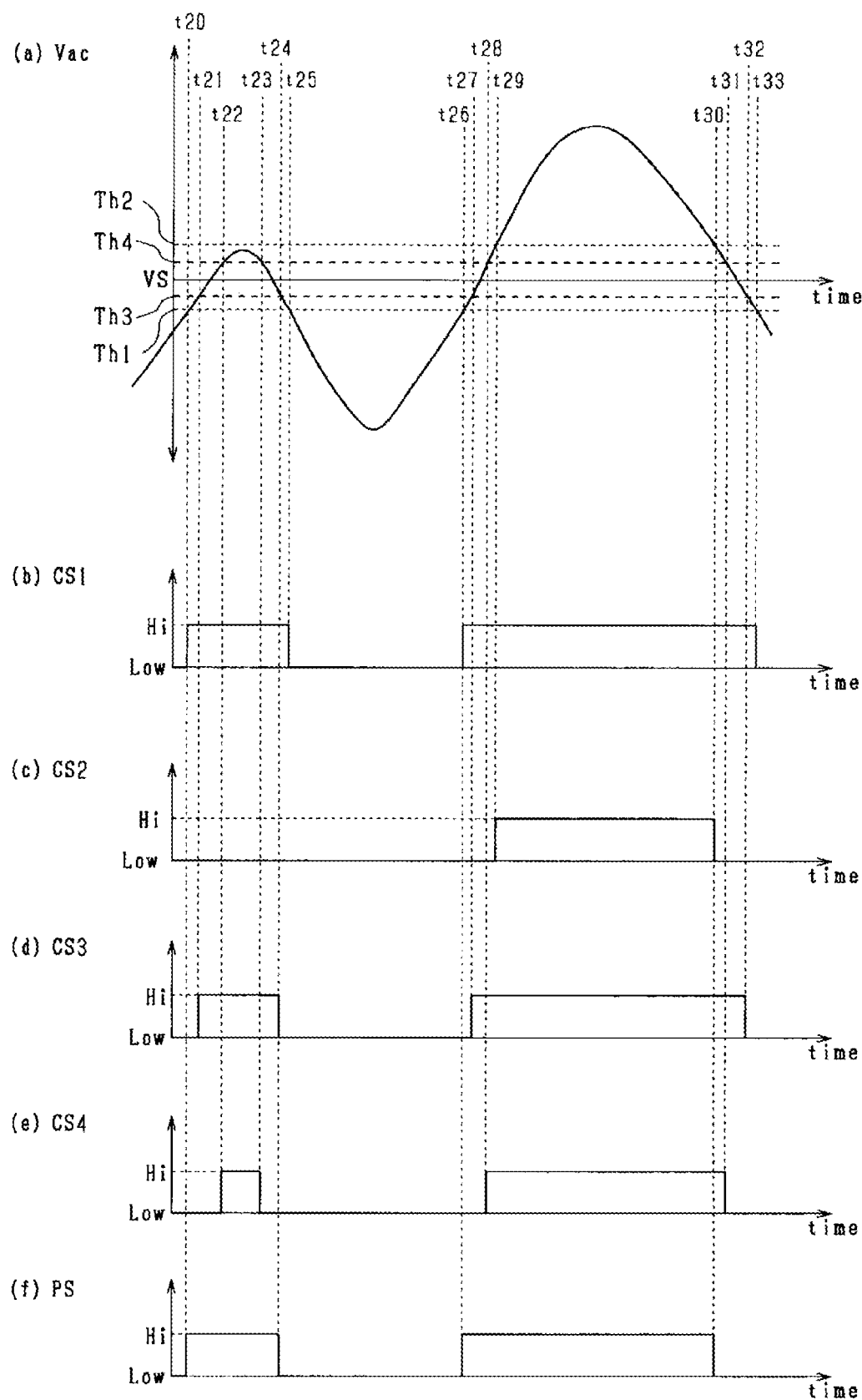
FIG. 14 is a diagram for explaining a manner in which the detection current changes in accompaniment with voltage variations.

The polarity determination according to the present embodiment will be described with reference to FIG. 14 and FIG. 15. FIG. 14 is a diagram for explaining the changes in the first to fourth comparison signals CS1 to CS4 and the polarity determination signal PS when the detected voltage Vac decreases without increasing to a predetermined amplitude amount as a result of sudden voltage variations after changing to increasing. FIG. 14 shows, in (a), the detected voltage Vac. FIG. 14 shows, in (b), the first comparison signal CS1. FIG. 14 shows, in (c), the second comparison signal CS2. FIG. 14 shows, in (d), the third comparison signal CS3. FIG. 14 shows, in (e), the fourth comparison signal CS4. FIG. 14 shows, in (f), the polarity determination signal PS.

In FIG. 14, as a result of the detected voltage Vac exceeding the first determination value Th1 at time t20, the first comparison signal CS1 changes from a low state to a high state. Consequently, the polarity determination signal PS changes from a low state to a high state.

As a result of the detected voltage Vac exceeding the third determination value Th3 and the fourth determination value Th4 in sequence at times t21 and t22, the third comparison signal CS3 and the fourth comparison signal CS4 change from a low state to a high state in sequence. Subsequently, the detected voltage Vac changes from increasing to decreasing without exceeding the second determination value Th2.

As a result of the detected voltage Vac falling below the fourth determination value Th4 at time t23, the fourth comparison signal CS4 changes from a high state to a low state. As a result of the detected voltage Vac falling below the third determination value Th3 at time t24, the third comparison signal CS3 changes from a high state to a low state.

Consequently, as a result of the first comparison signal CS1 being in a high state and the third comparison signal CS3 changing from a high state to a low state at time t24, the polarity determination signal PS changes from a high state to a low state, and the actual voltage Vr is determined to have switched from a positive polarity to a negative polarity.

At subsequent time t25, as a result of the detected voltage Vac falling below the first determination value Th1, the first comparison signal CS1 changes from a high state to a low state. After the detection value Vac changes from decreasing to increasing, as a result of the detection value Vac exceeding the first determination value Th1 at time t26, the first comparison signal CS1 changes from a low state to a high state.

Consequently, the polarity determination signal PS changes from a low state to a high state, and the actual voltage Vr is determined to have switched from a negative polarity to a positive polarity. As a result of the detected voltage Vac exceeding the third determination value Th3, the fourth determination value Th4, and the second determination value Th2 in sequence at times t27, t28, and t29, the third comparison signal CS3, the fourth comparison signal CS4, and the second comparison signal CS2 change from a low state to a high state in sequence.

As a result of the detected voltage Vac falling below the second determination value Th2 at time t30 after the detected voltage Vac has changed from increasing to decreasing, the second comparison signal CS2 changes from a high state to a low state. Consequently, the polarity determination signal PS changes from a high state to a low state, and the actual voltage Vr is determined to have switched from a positive polarity to a negative polarity.

Here, as a result of the detected voltage Vac falling below the fourth determination value Th4, the third determination value Th3, and the first determination value Th1 in sequence at times t31, t32, and t33, the fourth comparison signal CS4, the third comparison signal CS3, and the first comparison signal CS1 change from a high state to a low state in sequence.

Figure 15:
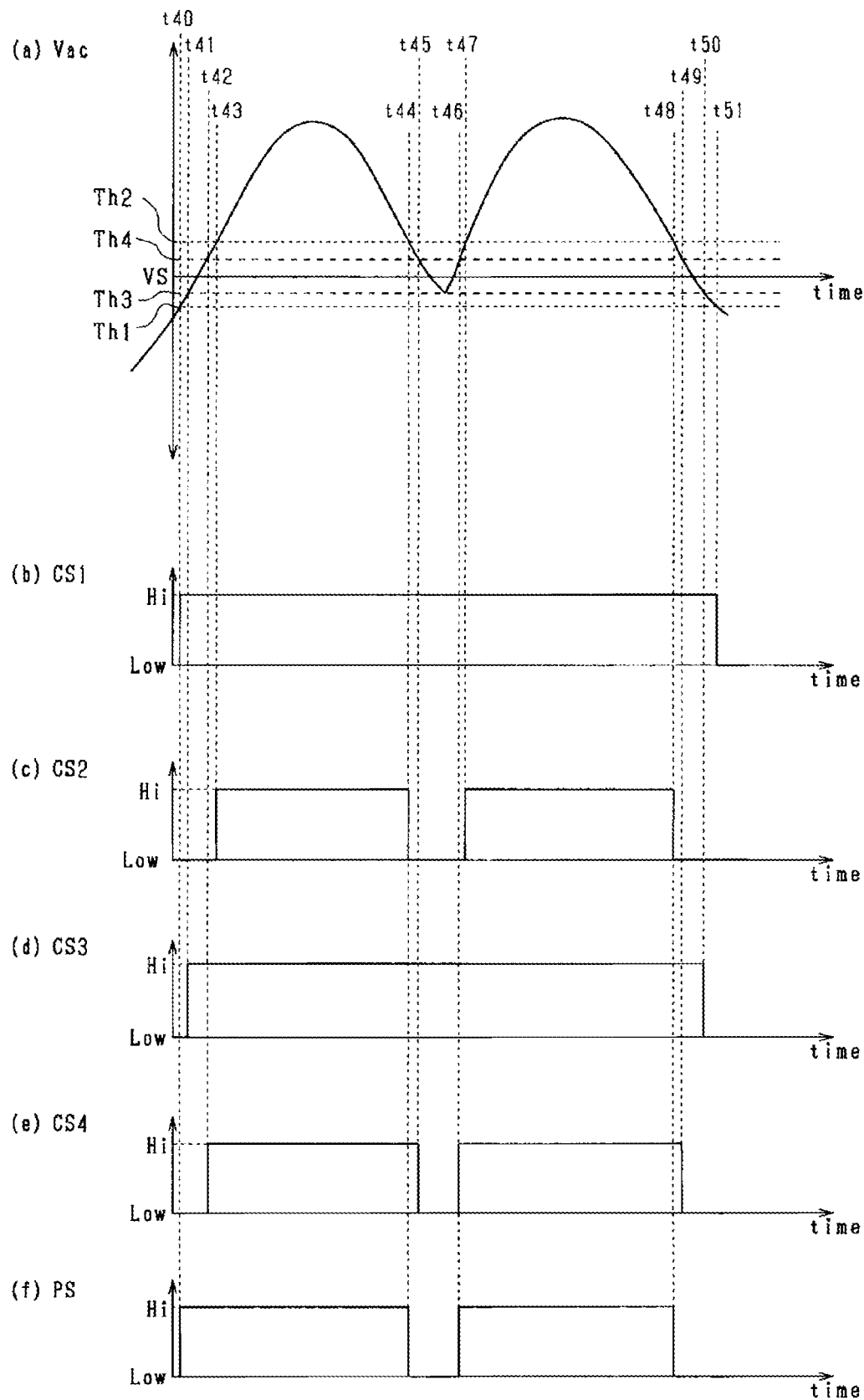
FIG. 15 is a diagram for explaining a manner in which the detection current changes in accompaniment with voltage variations.

FIG. 15 is a diagram for explaining the changes in the first to fourth comparison signals CS1 to CS4 and the polarity determination signal PS when the detected voltage Vac increases without falling to a predetermined amplitude amount as a result of sudden voltage variations after changing to decreasing. Here, (a) to (f) in FIG. 15 respectively correspond to (a) to (f) in FIG. 14. The changes in the first to fourth comparison signals CS1 to CS4 and the polarity determination signal PS during a period from time t40 to time t45 are identical to the changes in the first to fourth comparison signals CS1 to CS4 and the polarity determination signal PS from time t26 to time t31 in FIG. 14. Therefore, descriptions thereof are omitted.

As a result of the detected voltage Vac falling below the fourth determination value Th4 at time t45, the fourth comparison signal CS4 changes from a high state to a low state, and the detected voltage Vac subsequently changes from decreasing to increasing. The detected voltage Vac exceeds the fourth determination value Th4 at time t46 without falling below the first and third determination values Th1 and Th3, and the fourth comparison signal CS4 changes from a low state to a high state.

Consequently, as a result of the second comparison signal CS2 being in a low state and the fourth comparison signal CS4 changing from a low state to a high state at time t46, the polarity determination signal PS changes from a low state to a high state, and the actual voltage Vr is determined to have switched from a negative polarity to a positive polarity.

As a result of the detected voltage Vac exceeding the second determination value Th2 at time t47, the second comparison signal CS2 changes from a low state to a high state. As a result of the detected voltage Vac falling below the second determination value Th2 at time t48 after changing from increasing to decreasing, the second comparison signal CS2 changes from a high state to a low state.

Consequently, the polarity determination signal PS changes from a high state to a low state, and the actual voltage Vr is determined to have switched from a positive polarity to a negative polarity. Here, as a result of the detected voltage Vac falling below the fourth determination value Th4, the third determination value Th3, and the first determination value Th1 in sequence at times t49, t50, and t51, the fourth comparison signal CS4, the third comparison signal CS3, and the first comparison signal CS1 change from a high state to a low state in sequence.

According to the present embodiment described above, following effects can be achieved.

When the acquired detected voltage Vac is determined to have fallen below the third determination value Th3 without falling below the second determination value Th2 after exceeding the first determination value Th1, the polarity determining unit 55 determines that the polarity of the actual voltage Vr has switched from a positive polarity to a negative polarity.

In addition, when the detected voltage is determined to have exceed the fourth determination value Th4 without exceeding the first determination value Th1 after falling below the second determination value Th2, the polarity determining unit 55 determines that the polarity of the actual voltage Vr has switched from a negative polarity to a positive polarity. Consequently, the polarity of the actual voltage Vr can be prevented from continuing to be erroneously determined as a result of sudden voltage variations in the actual voltage Vr.

The polarity determining unit 55 variably sets the first determination value Th1 and the second determination value Th2 based on the amplitude ΔA of the detected voltage Vac. As a result, even when the zero-up-side detected voltage Vu and the zero-down-side detected voltage Vd deviate from the reference voltage Vs as a result of increase and decrease in the amplitude ΔA of the actual voltage Vr, an overcurrent can be suppressed from flowing to the alternating-current-side terminals TA1 and TA2.

The polarity determining unit 55 variably sets the first determination value Th1 and the second determination value Th2 based on the frequency F of the detected voltage Vac. As a result, even when the zero-up-side detected voltage Vu and the zero-down-side detected voltage Vd deviate from the reference voltage Vs as a result of increase and decrease in the frequency F of the actual voltage Vr, an overcurrent can be suppressed from flowing to the alternating-current-side terminals TA1 and TA2.

Variation Examples According to the Second Embodiment

In the polarity determining unit 55, the first comparing unit 76 to which the first determination value Th1 is inputted and the fourth comparing unit 79 to which the fourth determination value Th4 is inputted may be shared, and the second comparing unit 77 to which the second determination value Th2 is inputted and the third comparing unit 78 to which the third determination value Th3 is inputted may be shared.

Figure 16:
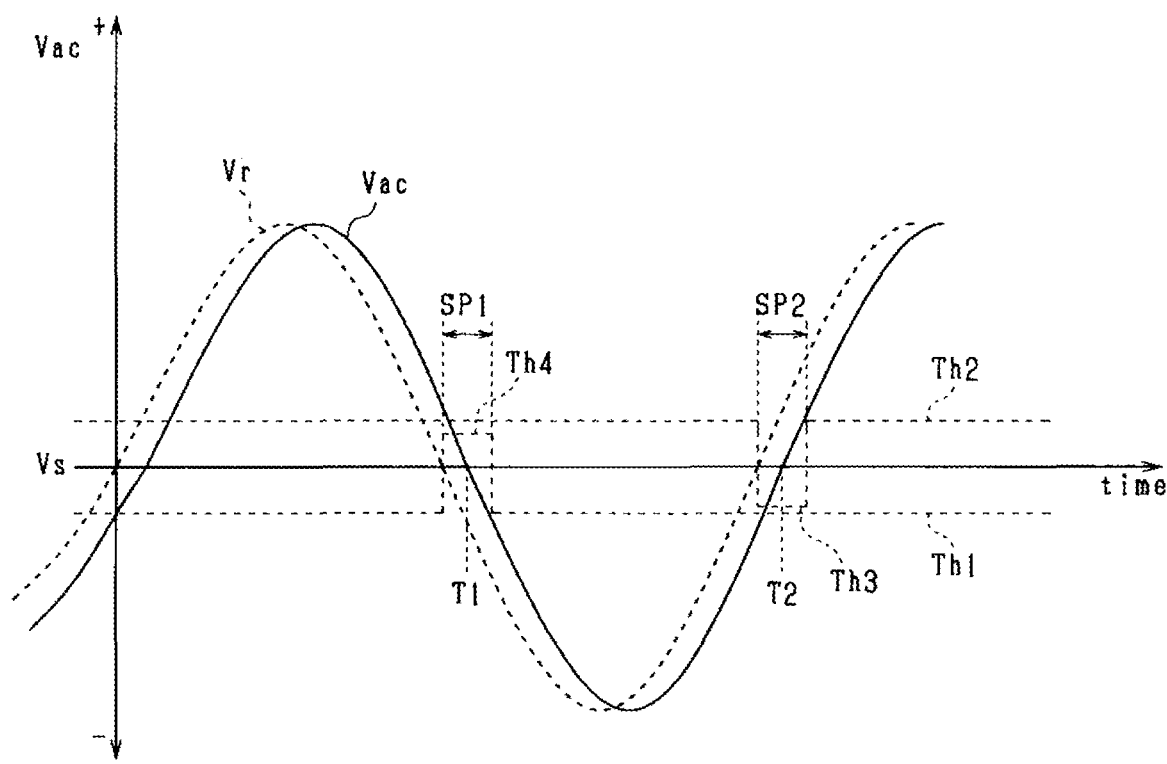
FIG. 16 is a diagram for explaining a determination signal in a variation example according to the second embodiment.

In this case, as shown in FIG. 16, the first- and fourth-determination-value outputting units 72 and 75 detect a timing T1 at which the detected voltage Vac falls below the reference voltage Vs. Then, during a predetermined first switching period SP1 that includes the detected timing T1 in the single cycle T of the detected voltage Vac, the fourth-determination-value outputting unit 75 inputs the fourth determination value Th4 to the first comparing unit 76.

In addition, during a period other than the first switching period SP1 in the single cycle T of the detected voltage Vac, the first-determination-value outputting unit 72 may input the first determination value Th1 to the first comparing unit 76. The second- and third-determination-value outputting units 73 and 74 detect a timing T2 at which the detected voltage Vac exceeds the reference voltage Vs.

Then, during a predetermined second switching period SP2 that includes the detected timing T2 in the single cycle T of the detected voltage Vac, the third-determination-value outputting unit 74 inputs the third determination value Th3 to the second comparing unit 77. In addition, during a period other than the second switching period SP2 in the single cycle T of the detected voltage Vac, the second-determination-value outputting unit 73 may input the second determination value Th1 to the second comparing unit 77.

The first comparing unit 76 outputs the first comparison signal CS1 during the period other than the first switching period SP1 in the single cycle T of the detected voltage Vac, and outputs the fourth comparison signal CS4 during the first switching period SP1. The second comparing unit 77 outputs the second comparing signal CS2 during the period other than the second switching period SP2 in the single cycle T of the detected voltage Vac, and outputs the third comparison signal CS3 during the second switching period SP2.

Third Embodiment

According to a third embodiment, configurations that differ from those according to the first embodiment are mainly described. Here, configurations that are given the same reference numbers as those according to the first embodiment indicate identical configurations. Descriptions thereof are not repeated.

When the timing at which the detected voltage Vac becomes the reference voltage Vs is shifted from the zero-cross timing of the actual voltage Vr, an average value of the output current Iac close to the timing at which the detected voltage Vac becomes the reference voltage Vs is a value that deviates from zero.

Specifically, the average value of the output current Iac becomes a greater value as a width of shift of the timing at which the detected voltage Vac becomes the reference voltage Vs in relation to the zero-cross timing of the actual voltage Vr increases. Here, according to the present embodiment, the control apparatus 30 corrects the first and second determination values Th1 and Th2 based on the average value of the output current Iac during a predetermined period that includes the timing at which the detected voltage Vac becomes the reference voltage Vs.

Figure 17:
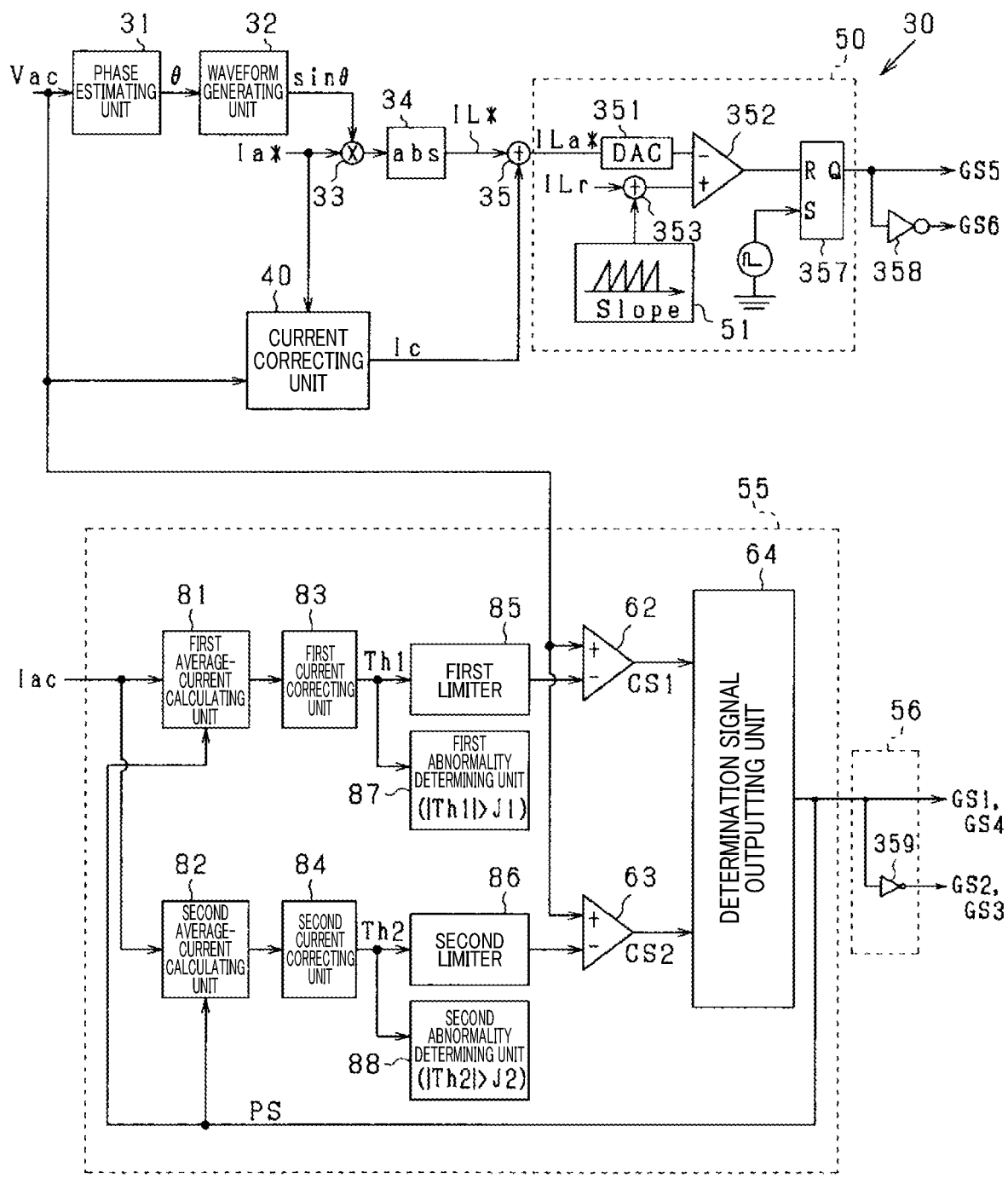
FIG. 17 is a functional block diagram of a control apparatus according to a third embodiment.

The polarity determining unit 55 shown in FIG. 17 includes a first average-current calculating unit 81, a second average-current calculating unit 82, a first current correcting unit 83, a second current correcting unit 84, a first limiter 85, a second limiter 86, a first abnormality determining unit 87, and a second abnormality determining unit 88. According to the present embodiment, the control apparatus 30 provides a function as a current acquiring unit.

The output current Iac and the polarity determination signal PS from the determination signal outputting unit 64 are inputted to the first average-current calculating unit 81 and the second average-current calculating unit 82. The first average-current calculating unit 81 calculates a zero-up-side average current that is an average value of the output current Iac during a predetermined period that includes a timing at which the polarity determination signal PS switches from a low state to a high state. The second average-current calculating unit 82 calculates a zero-down-side average current that is an average value of the output current Iac during a predetermined period that includes a timing at which the polarity determination signal PS switches from a high state to a low state.

For example, the first and second average-current calculating units 81 and 82 may acquire a plurality of output currents Iac during the predetermined period in the single cycle T of the detected voltage Vac. The first average-current calculating unit 81 calculates the zero-up-side average current based on the acquired plurality of output currents Iac. In addition, the second average-current calculating unit 81 calculates the zero-down-side average current based on the acquired plurality of output currents Iac. Her, a resonance current that accompanies the on/off operations of the first to fourth switches SW1 to SW4 may flow to the full-bridge circuit 12. Therefore, the output current Iac that is used in calculation of the average current may be a value in a period in which the resonance current does not flow to the full-bridge circuit 12 during the predetermined period.

The calculated zero-up-side average current is inputted to the first current correcting unit 83. The first current correcting unit 83 calculates the first determination value Th1 for bringing the zero-up-side average current closer to zero. Specifically, the first current correcting unit 83 calculates the first determination value Th1 as a manipulated variable for performing feedback control of the zero-up-side average current to zero. According to the present embodiment, as feedback control, integral control is used. As a result of the process of the first current correcting unit 83, the first determination value Th1 is corrected such that the zero-up-side average current is brought closer to zero.

The calculated zero-down-side average current is inputted to the second current correcting unit 84. The second current correcting unit 84 calculates the second determination value Th2 for bringing the zero-down-side average current closer to zero. Specifically, the second current correcting unit 84 calculates the second determination value Th2 as a manipulated variable for performing feedback control of the zero-down-side average current to zero. According to the present embodiment, as feedback control, integral control is used. As a result of the process of the second current correcting unit 84, the second determination value Th2 is corrected such that the zero-down-side average current is brought closer to zero.

The first determination value Th1 that is calculated by the first current correcting unit 83 is inputted to the inverted input terminal of the first comparing unit 62 after an upper limit value or a lower limit value is restricted by the first limiter 85. The second determination value Th2 that is calculated by the second current correcting unit 84 is inputted to the inverted input terminal of the second comparing unit 63 after an upper limit value or a lower limit value is restricted by the second limiter 86. The determination signal outputting unit 64 determines the polarity of the actual voltage Vr based on the first comparison signal CS1 from the first comparing unit 62 and the second comparison signal CS2 from the second comparing unit 63.

The first determination value Th1 is also inputted to the first abnormality determining unit 87. The first abnormality determining unit 87 determines that the first determination value Th1 is in an abnormal state in which the first determination value Th1 is not normally calculated when an absolute value of the first determination value Th1 is greater than a predetermined first abnormality determination value J1. The second determination value Th2 is also inputted to the second abnormality determining unit 88. The second abnormality determining unit 88 determines that the second determination value Th2 is in an abnormal state in which the second determination value Th2 is not normally calculated when an absolute value of the second determination value Th2 is greater than a predetermined second abnormality determination value J2.

For example, when an abnormality in the first and second determination values Th1 and Th2 is determined, the polarity determining unit 55 may not perform the polarity determination of the actual voltage Vr using the first and second determination values Th1 and Th2, and may stop the operation of the power conversion apparatus 100.

According to the present embodiment described above, following effects can be achieved.

The first and second determination values Th1 and Th2 are corrected based on the average value of the output current Iac during the predetermined period that includes the timing at which the polarity of the actual voltage Vr is switched. This makes it possible to suppress, in real time, a shift in the timing at which the set that is set to an ON state, of the set of the first and fourth switches SW1 and SW4 and the set of the second and third switches SW2 and SW3, is switched.

The control apparatus 30 performs determination regarding whether the first and second determination values Th1 and Th2 are in an abnormal state in which the first and second determination values Th1 and Th2 are not normally calculated. As a result, for example, operation of the power conversion apparatus 100 can be prevented from being continued in a state in which an abnormality has occurred in the power conversion apparatus 100.

Variation Examples According to the Third Embodiment

Instead of the zero-up-side average current and the zero-down-side average current, the polarity determining unit 55 may correct the first and second determination values Th1 and Th2 based on a single output current Iac that is detected during the predetermined period that includes the timing at which the polarity of the actual voltage Vr is determined to have switched.

In this case, the first current correcting unit 83 may correct the first determination value Th1 based on the single output current Iac that is detected near the timing at which the actual voltage Vr is determined to have switched from a negative polarity to a positive polarity.

The second current correcting unit 84 may correct the second determination value Th2 based on the single output current Iac that is detected near the timing at which the actual voltage Vr is determined to have switched from a positive polarity to a negative polarity.

Fourth Embodiment

According to a fourth embodiment, configurations that differ from those according to the third embodiment are mainly described. Here, configurations that are given the same reference numbers as those according to the third embodiment indicate identical configurations. Descriptions thereof are not repeated.

A phenomenon in which the timing at which the detected voltage Vac becomes the reference voltage Vs shifts from the zero-cross timing of the actual voltage Vr also occurs as a result of the detected voltage Vac being offset above or below the actual voltage Vr as a result of the detected voltage Vac including an offset error. Here, when the detected voltage Vac is offset above or below the actual voltage Vr, a difference occurs between the first period P1 in which the detected voltage Vac is positive and the second period P2 in which the detected voltage Vac is negative in the single cycle T of the detected voltage Vac.

Therefore, according to the present embodiment, the polarity determining unit 55 corrects the first determination value Th1 and the second determination value Th2 based on a difference of the second period P2 in relation to the first period P1 in the single cycle T of the detected voltage Vac.

Figure 18:
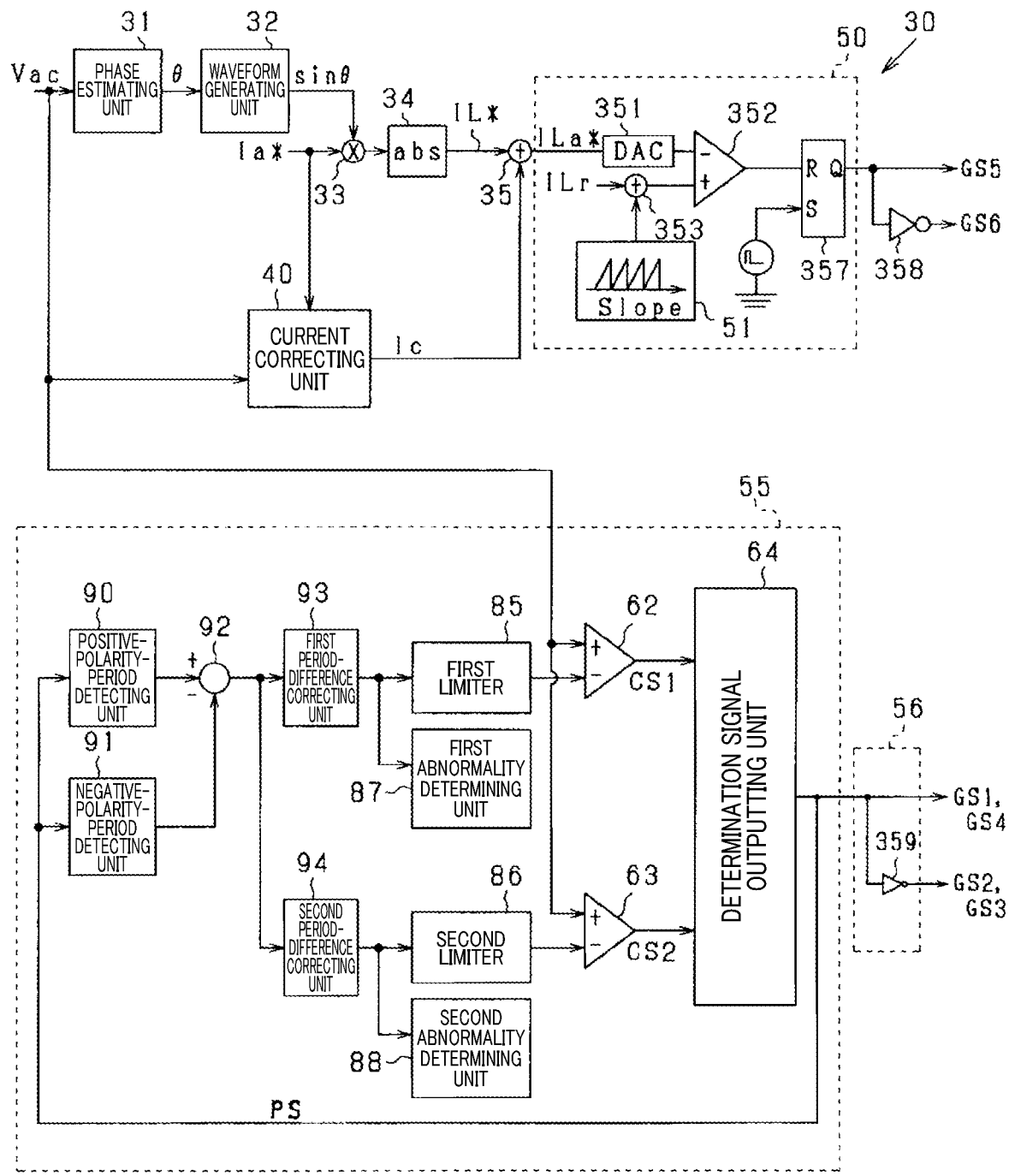
FIG. 18 is a functional block diagram of a control apparatus according to a fourth embodiment.

The polarity determining unit 55 shown in FIG. 18 includes a positive-polarity-period detecting unit 90, a negative-polarity-period detecting unit 91, a period difference calculating unit 92, a first period-difference correcting unit 93, and a second period-difference correcting unit 94.

The polarity determination signal PS from the determination signal outputting unit 64 is inputted to the positive-polarity-period detecting unit 90. The positive-polarity-period detecting unit 90 detects a length during which the polarity determination signal Ps is in a high state in the single cycle T of the detected voltage Vac as a length of the first period P1 in the single cycle T of the detected voltage Vac.

The polarity determination signal PS from the determination signal outputting unit 64 is inputted to the negative-polarity-period detecting unit 91. The negative-polarity-period detecting unit 91 detects a length during which the polarity determination signal Ps is in a low state in the single cycle T of the detected voltage Vac as a length of the second period P2 in the single cycle T of the detected voltage Vac.

The detected length of the first period P1 and length of the second period P2 are inputted to the period difference calculating unit 92. The period difference calculating unit 92 outputs a value that is obtained by the length of the second period P2 being subtracted from the length of the first period P1 as an offset determination value.

The calculated offset determination value is inputted to the first period-difference correcting unit 93. The first period-difference correcting unit 93 calculates the first determination value Th1 for bringing the offset determination value closer to zero. Specifically, the first period-difference correcting unit 93 calculates the first determination value Th1 as a manipulated variable for performing feedback control of the offset determination value to zero. According to the present embodiment, as feedback control, integral control is used. As a result of the process by the first period-difference correcting unit 93, the first determination value Th1 is corrected to bring the offset determination value closer to zero.

The calculated offset determination value is also inputted to the second period-difference correcting unit 94. The second period-difference correcting unit 94 calculates the second determination value Th2 for bringing the offset determination value closer to zero. Specifically, the second period-difference correcting unit 94 calculates the second determination value Th2 as a manipulated variable for performing feedback control of the offset determination value to zero. According to the present embodiment, as feedback control, integral control is used. As a result of the process by the second period-difference correcting unit 94, the second determination value Th2 is corrected to bring the offset determination value closer to zero.

The calculated first and second determination values Th1 and Th2 are inputted to the first and second comparing units 62 and 63 after the upper limit values and the lower limit values are restricted by the first and second limiters 85 and 86. The determination signal outputting unit 64 determines the polarity of the actual voltage Vr based on the first comparison signal CS1 from the first comparing unit 62 and the second comparison signal CS2 from the second comparing unit 63. The first threshold value Th1 is also inputted to the first abnormality determining unit 87. The second threshold value Th2 is also inputted to the second abnormality determining unit 88. The first and second abnormality determining units 87 and 88 determine presence/absence of an abnormal state based on the first and second determination values Th1 and Th2.

According to the present embodiment described above, effects similar to those according to the third embodiment can be obtained.

Variation Examples According to the Fourth Embodiment

The polarity determining unit 55 may correct the first determination value Th1 and the second determination value Th2 based on a ratio of the second period P2 to the first period P1 in the single cycle T of the detected voltage Vac. In this case, the polarity determining unit 55 may use, as the offset determination value, the ratio of the second period P2 to the first period P1 in the single cycle T of the detected voltage Vac.

Fifth Embodiment

According to a fifth embodiment, configurations that differ from those according to the first embodiment are mainly described. Here, configurations that are given the same reference numbers as those according to the first embodiment indicate identical configurations. Descriptions thereof are not repeated.

An offset error that occurs in the reference voltage Vs of the alternating-current voltage sensor 23 is a factor in the timing at which the detected voltage Vac becomes the reference voltage Vs shifting from the zero-cross timing of the actual voltage Vr. Specifically, the detected voltage Vac is offset above or below the actual voltage Vr as a result of the offset error that occurs in the reference voltage Vs, and the timing at which the detected voltage Vac becomes the reference voltage Vs shifts from the zero-cross timing of the actual voltage Vr. According to the present embodiment, the first and second determination values Th1 and Th2 are corrected based on a voltage difference between the reference voltage Vs and the first and second determination values Th1 and Th2.

Figure 19:
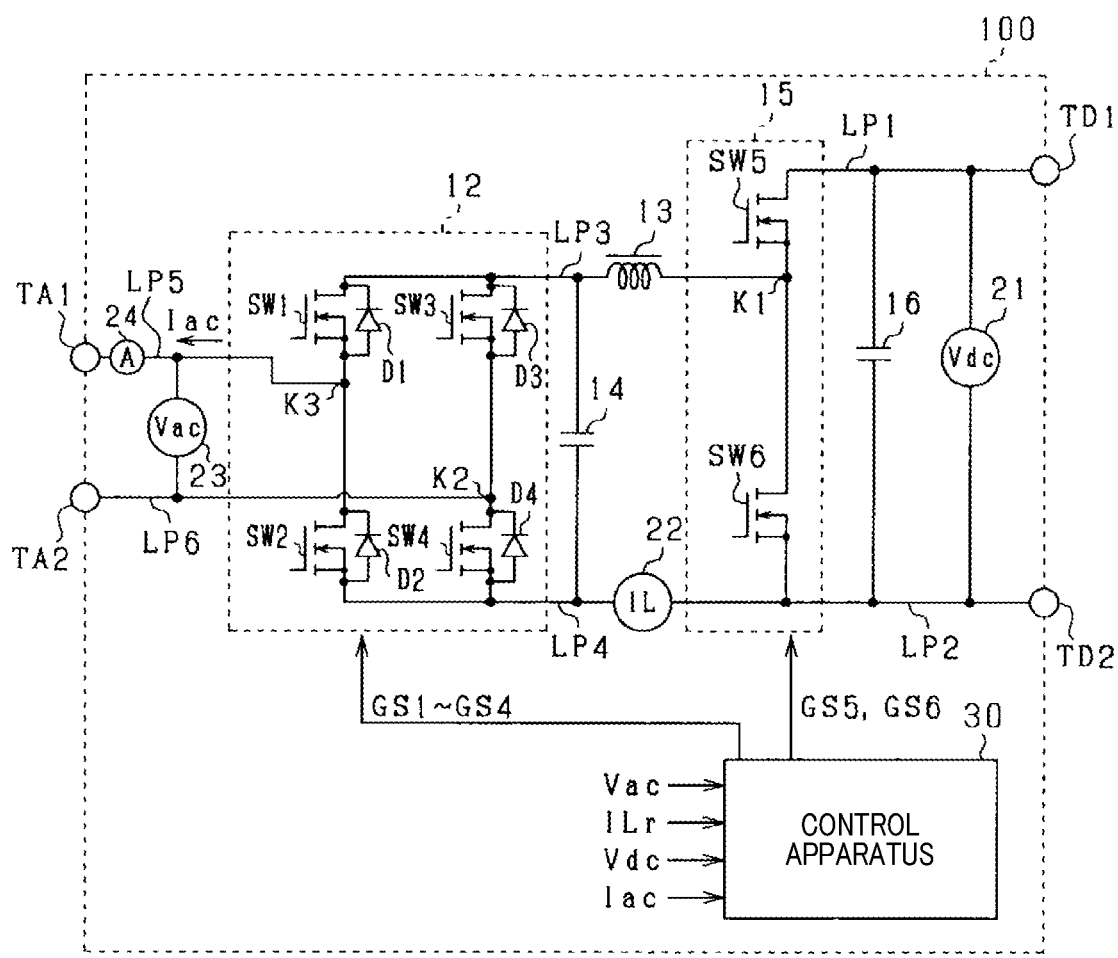
FIG. 19 is a diagram for explaining a connection state between a power conversion apparatus and an alternating-current power supply according to a fifth embodiment.

According to the present embodiment, the control apparatus 30 is capable of switching between ordinary driving mode in which electric power is converted between the direct-current voltage and the alternating-current voltage, and diagnostic mode in which the first and second determination values Th1 and Th2 are corrected, as a driving mode of the power conversion apparatus 100. In the diagnostic mode, the control apparatus 30 performs correction of the first and second determination values Th1 and Th2 according to the present embodiment. In addition, when the control apparatus 30 performs the diagnostic mode, as shown in FIG. 19, the alternating-current power supply 200 is not connected to the power conversion apparatus 100. That is, in the diagnostic mode, the detected voltage Vac when the actual voltage Vr is zero is used as the reference voltage Vs.

Figure 20:
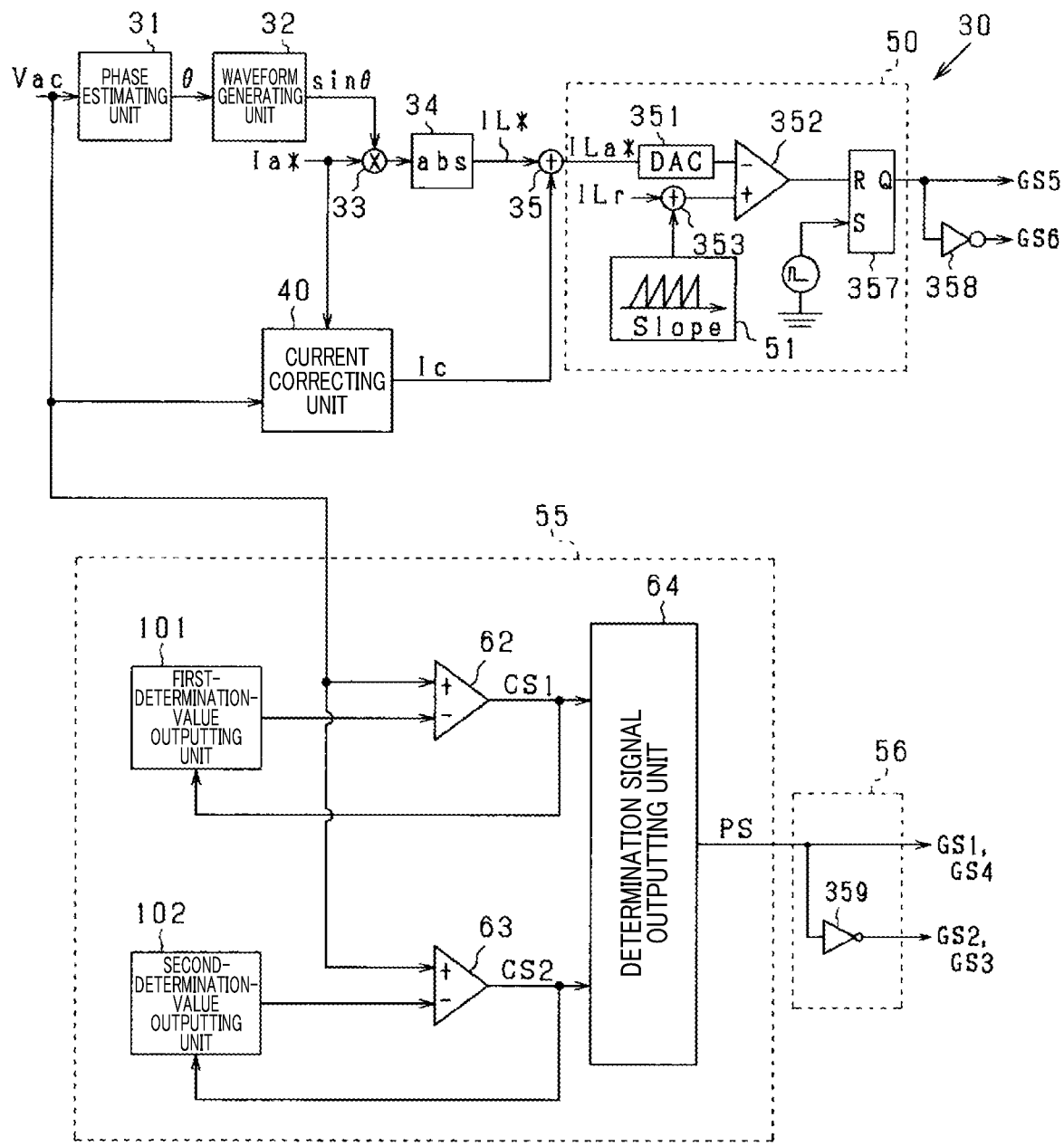
FIG. 20 is a functional block diagram of a control apparatus.

The polarity determining unit 55 shown in FIG. 20 includes a first-determination-value outputting unit 101 and a second-determination-value outputting unit 102. The first comparison signal CS1 from the first comparing unit 62 is inputted to the first-determination-value outputting unit 101. The first-determination-value outputting unit 101 calculates the first determination value Th1 to bring the first comparison signal CS1 outputted from the first comparing unit 62 closer to zero. Specifically, the first-determination-value outputting unit 101 changes the first determination value Th1, and sets, as the first determination value Th1 after correction, the first determination value Th1 at a timing at which the first comparison signal CS1 changes from a low state to a high state.

The second comparison signal CS2 from the second comparing unit 63 is inputted to the second-determination-value outputting unit 102. The second-determination-value outputting unit 102 calculates the second determination value Th2 to bring the second comparison signal CS2 outputted from the second comparing unit 63 closer to zero. Specifically, the second-determination-value outputting unit 102 changes the second determination value Th2, and sets the second determination value Th2 at a timing at which the second comparison signal CS2 changes from a low state to a high state as the second determination value Th2 after correction.

Correction of the first and second determination values Th1 and Th2 by the first- and second-determination-value outputting units 101 and 102 is performed over a period in which the driving mode is switched to the diagnostic mode. The first and second determination values Th1 and Th2 after correction are stored in a storage unit (not shown) that is provided in the control apparatus 30. After the driving mode of the power conversion apparatus 100 is switched from the diagnostic mode to the ordinary driving mode, the first determination value Th1 after correction is outputted from the first-determination-value outputting unit 101 and the second determination value Th2 after correction is outputted from the second-determination-value outputting unit 102.

According to the present embodiment described above, effects similar to those according to the first embodiment can be obtained.

The reference voltage Vs that is used in the correction of the first and second determination values Th1 and Th2 may be detected by the control apparatus 30 in a state in which the power conversion apparatus 100 is connected to the alternating-current power supply 200.

Figure 21:
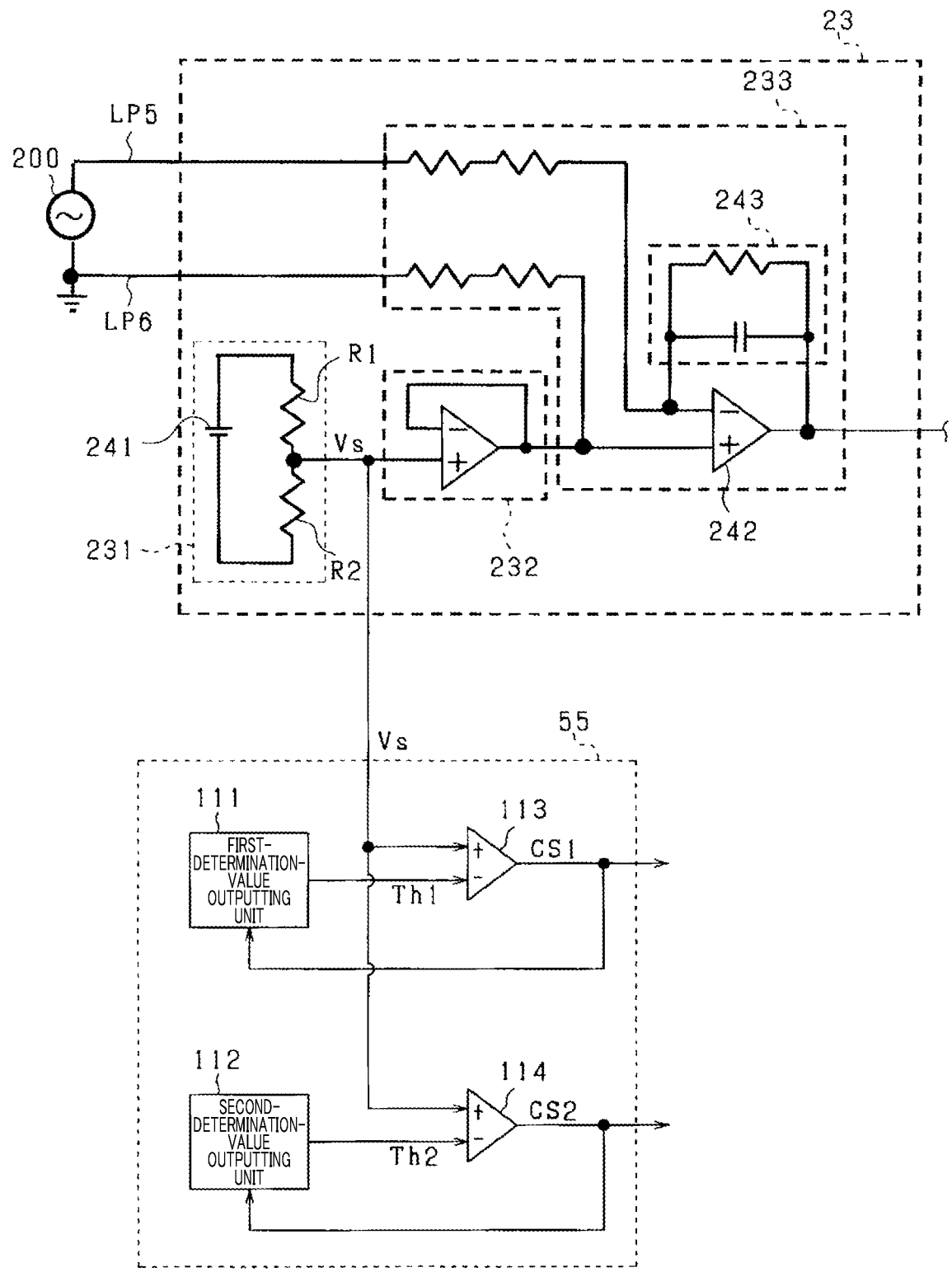
FIG. 21 is a diagram for explaining a polarity determining unit in a variation example according to the fifth embodiment.

FIG. 21 is a diagram for explaining a configuration of the polarity determining unit 55 in the diagnostic mode according to the present embodiment. According to the present embodiment, the reference voltage generating unit 231 of the alternating-current voltage sensor 23 is connected to the control apparatus 30. The reference voltage Vs that is generated by the reference voltage generating unit 231 is inputted to the control apparatus 30. Here, in the ordinary driving mode, the control apparatus 30 may be configured as shown in FIG. 20.

The polarity determining unit 55 includes a first-determination-value outputting unit 111, a second-determination-value outputting unit 112, a first comparing unit 113, and a second comparing unit 114. The first determination value Th1 from the first-determination-value outputting unit 111 is inputted to an inverted input terminal of the first comparing unit 113. The reference voltage Vs is inputted to a non-inverted input terminal of the first comparing unit 113. The second determination value Th2 from the second-determination-value outputting unit 112 is inputted to an inverted input terminal of the second comparing unit 114. The reference voltage Vs is inputted to a non-inverted input terminal of the second comparing unit 113.

The first comparison signal CS1 from the first comparing unit 113 is inputted to the first-determination-value outputting unit 111. The first-determination-value outputting unit 111 calculates the first determination value Th1 for bringing the first comparison signal CS1 closer to zero. As a result of the process by the first-determination-value outputting unit 111, the first determination value Th1 is corrected to bring the first comparison signal CS1 closer to zero.

The second comparison signal CS2 from the second comparing unit 114 is inputted to the second-determination-value outputting unit 112. The second-determination-value outputting unit 112 calculates the second determination value Th2 for bringing the second comparison signal CS2 closer to zero. As a result of the process by the second-determination-value outputting unit 112, the second determination value Th2 is corrected to bring the second comparison signal CS2 closer to zero.

According to the present embodiment described above, effects similar to those according to the first embodiment can be obtained.

When the first and second determination values Th1 and Th2 are the same value, either of the first and second determination values Th1 and Th2 may be inputted to the first comparing unit and the second comparing unit as a voltage determination value after correction. In this case, when the first determination value Th1 is inputted to the first and second comparing units, the second-determination-value outputting unit may be eliminated. In addition, when the second determination value Th2 is inputted to the first and second comparing units, the first-determination-value outputting unit may be eliminated.

The polarity determining unit 55 may include an abnormality determining unit that determines that the power conversion apparatus is abnormal when the first and second determination values Th1 and Th2 after correction are greater than an abnormality determination value.

OTHER EMBODIMENTS

The first to fourth switches SW1 to SW4 may be insulated-gate bipolar transistors (IGBTs). In this case, instead of the body diodes, freewheeling diodes are connected in antiparallel to the first to fourth switches SW1 to SW4.

The power conversion apparatus 100 may be a bidirectional power conversion apparatus that converts either of the inputted direct-current power and alternating-current power to the other, in addition to being that which converts the direct-current voltage to the alternating-current voltage. When the power conversion apparatus 100 converts the alternating-current power to the direct-current power, the sixth switch SW6 corresponds to a drive switch.

Instead of outputting the fifth gate signal GS5 for operating the fifth switch SW5 by peak-current-mode control, the control apparatus 30 may output the fifth gate signal GS5 by average-current-mode control.

The control apparatus and the method thereof described in the present disclosure may be actualized by a dedicated computer that is provided so as to be configured by a processor and a memory, the processor being programmed to provide one or a plurality of functions that are realized by a computer program. Alternatively, the control apparatus and the method thereof described in the present disclosure may be actualized by a dedicated computer that is provided by a processor being configured by a single dedicated hardware logic circuit or more. Still alternatively, the control apparatus and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory tangible recording medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control apparatus for a power conversion apparatus that includes a reactor, a first alternating-current-side terminal, a second alternating-current-side terminal, a first direct-current-side terminal, a second direct-current-side terminal, and a full-bridge circuit that is provided between the alternating-current-side terminals and the reactor, the power conversion apparatus being provided with at least either of a function for converting an alternating-current voltage of an alternating-current power supply that is inputted from the alternating-current-side terminals to a direct-current voltage and outputting the direct-current voltage from the direct-current-side terminals, and a function for converting a direct-current voltage that is inputted from the direct-current-side terminals to an alternating-current voltage and outputting the alternating-current voltage from the alternating-current-side terminals, wherein the full-bridge circuit has a series-connection body of a first switch and a second switch, and a series-connection body of a third switch and a fourth switch, and is configured by the series-connection bodies being connected in parallel;

diodes are respectively connected in antiparallel to the first switch, the second switch, the third switch, and the fourth switch, a connection point between the first switch and the second switch is connected to the first alternating-current-side terminal, a connection point between the third switch and the fourth switch is connected to the second alternating-current-side terminal, the control apparatus includes:
a detected voltage acquiring unit that acquires a detected voltage that is a voltage value of the alternating-current power supply that is detected by a voltage sensor;

a polarity determining unit that determines a period from when the detected voltage exceeds a first determination value for determining a zero-up-crossing timing of an actual voltage that is an actual voltage value of the alternating-current power supply until the detected voltage falls below a second determination value for determining a zero-down-crossing timing of the actual voltage to be a period during which the actual voltage has a positive polarity, and determines a period from when the detected voltage falls below the second determination value until the detected voltage exceeds the first determination value to be a period during which the actual voltage has a negative polarity, wherein the first determination value is a voltage value that is less than the detected voltage when the actual voltage is zero, and the second determination value is a voltage value that is greater than the detected voltage when the actual voltage is zero; and an operating unit that alternately switches a set that is set to an ON state, of a set of the first switch and the fourth switch and a set of the second switch and the third switch, each time the polarity of the actual voltage that is determined by the polarity determining voltage is switched.

2. The control apparatus for a power conversion apparatus according to claim 1, wherein:

In response to an intermediate value between the first determination value and the second determination value being an intermediate determination value, the polarity determining unit determines that the polarity of the actual voltage has switched from a positive polarity to a negative polarity when the acquired detected voltage is determined to have fallen below the intermediate determination value without falling below the second determination value after exceeding the first determination value, and determines that the polarity of the actual voltage has switched from a negative polarity to a positive polarity when the acquired detected voltage is determined to have exceeded the intermediate determination value without exceeding the first determination value after falling below the second determination value.

3. The control apparatus for a power conversion apparatus according to claim 2, further comprising:

an amplitude detecting unit that detects an amplitude of the detected voltage, wherein the polarity determining unit variably sets the first determination value and the second determination value based on the detected amplitude of the detected voltage.

4. The control apparatus for a power conversion apparatus according to claim 3, further comprising:

a frequency detecting unit that detects a frequency of the detected voltage, wherein the polarity determining unit variably sets the first determination value and the second determination value based on the detected frequency of the detected voltage.

5. The control apparatus for a power conversion apparatus according to claim 1, further comprising:

a current acquiring unit that acquires a current that flows between the first alternating-current-side terminal or the second alternating-current side terminal and the full-bridge circuit, and is an alternating-current current that is detected by a current sensor, wherein the polarity determining unit corrects the first determination value and the second determination value based on the acquired alternating-current current.

6. The control apparatus for a power conversion apparatus according to claim 5, further comprising:

a first average-current calculating unit that calculates a zero-up-side average current that is an average value of the alternating-current current that is acquired during a predetermined period that includes a timing at which the actual voltage is determined to have switched from a negative polarity to a positive polarity by the polarity determining unit; and a second average-current calculating unit that calculates a zero-down-side average current that is an average value of the alternating-current current that is acquired during a predetermined period that includes a timing at which the actual voltage is determined to have switched from a positive polarity to a negative polarity by the polarity determining unit, wherein the polarity determining unit corrects the first determination value based on the calculated zero-up-side average current and corrects the second determination value based on the calculated zero-down-side average current.

7. The control apparatus for a power conversion apparatus according to claim 5, further comprising:

an abnormality determining unit that determines that the power conversion apparatus is abnormal when a condition that the first determination value after correction by the polarity determining unit is greater than an abnormality determination value thereof, or a condition that the second determination value after correction by the polarity determining unit is greater than an abnormality determination value thereof is determined to be established.

8. The control apparatus for a power conversion apparatus according to claim 1, wherein:

the polarity determining unit corrects the first determination value and the second determination value such that a period in which the actual voltage is determined to have a positive polarity and a period in which the actual voltage is determined to have a negative polarity are equal.

9. The control apparatus for a power conversion apparatus according to claim 1, wherein:

the polarity determining unit corrects the first determination value and the second determination value based on a difference between a reference voltage and the first determination value or a difference between the reference voltage and the second determination value, the reference voltage being the detected voltage when the actual voltage is zero.

10. The control apparatus for a power conversion apparatus according to claim 9, wherein:

the polarity determining unit acquires the detected voltage when the power conversion apparatus is not connected to the alternating-current power supply as the reference voltage.

11. The control apparatus for a power conversion apparatus according to claim 10, further comprising:

an abnormality determining unit that determines that the power conversion apparatus is abnormal when a condition that the first determination value after correction by the polarity determining unit is greater than an abnormality determination value thereof, or a condition that the second determination value after correction by the polarity determining unit is greater than an abnormality determination value thereof is determined to be established.

12. The control apparatus for a power conversion apparatus according to claim 1, further comprising:

an amplitude detecting unit that detects an amplitude of the detected voltage, wherein the polarity determining unit variably sets the first determination value and the second determination value based on the detected amplitude of the detected voltage.

13. The control apparatus for a power conversion apparatus according to claim 1, further comprising:

a frequency detecting unit that detects a frequency of the detected voltage, wherein the polarity determining unit variably sets the first determination value and the second determination value based on the detected frequency of the detected voltage.

* * * * *